US008615390B2

(12) United States Patent
Kovesi et al.

(10) Patent No.: US 8,615,390 B2
(45) Date of Patent: Dec. 24, 2013

(54) LOW-DELAY TRANSFORM CODING USING WEIGHTING WINDOWS

(75) Inventors: Balazs Kovesi, Lannion (FR); David Virette, Pleumeur Bodou (FR); Pierrick Philippe, Melese (FR)

(73) Assignee: France Telecom, Paris (FR)

( * ) Notice: Subject to any disclaimer, the term of this patent is extended or adjusted under 35 U.S.C. 154(b) by 918 days.

(21) Appl. No.: 12/448,734

(22) PCT Filed: Dec. 18, 2007

(86) PCT No.: PCT/FR2007/052541
§ 371 (c)(1),
(2), (4) Date: Jul. 2, 2009

(87) PCT Pub. No.: WO2008/081144
PCT Pub. Date: Jul. 10, 2008

(65) Prior Publication Data

US 2010/0076754 A1 Mar. 25, 2010

(30) Foreign Application Priority Data

Jan. 5, 2007 (FR) ..................................... 07 00056
Apr. 17, 2007 (FR) ..................................... 07 02768

(51) Int. Cl.
*G06F 15/00* (2006.01)
*G10L 19/00* (2013.01)
*G10L 25/00* (2013.01)
*G10L 21/00* (2013.01)
*G10L 25/90* (2013.01)
*G10L 21/02* (2013.01)

(52) U.S. Cl.
USPC ......... 704/200; 704/200.1; 704/206; 704/228

(58) Field of Classification Search
USPC ............................... 704/200, 200.1, 206, 228
See application file for complete search history.

(56) References Cited

U.S. PATENT DOCUMENTS 4,852,179 A * 7/1989 Fette ............................. 704/230
5,173,695 A * 12/1992 Sun et al. ......................... 341/67

(Continued)

FOREIGN PATENT DOCUMENTS

WO WO 98/02971 1/1998

OTHER PUBLICATIONS

Niamut et al., "RD Optimal Time Segmentations for the Time-Varying MDCT", Proceedings of the European Signal Processing Conference, Sep. 6, 2004, XP-002391769, pp. 1649-1652.

(Continued)

*Primary Examiner* — Eric Yen
(74) *Attorney, Agent, or Firm* — Knobbe Martens Olson & Bear LLP

(57) ABSTRACT

The invention relates to transform coding/decoding of a digital audio signal represented by a succession of frames, using windows of different lengths. For the coding within the meaning of the invention, it is sought to detect (51) a particular event, such as an attack, in a current frame (Ti); and, at least if said particular event is detected at the start of the current frame (53), a short window (54) is directly applied in order to code (56) the current frame (Ti) without applying a transition window. Thus, the coding has a reduced delay in relation to the prior art. In addition, an ad hoc processing is applied during decoding in order to compensate for the direct passage from a long window to a short window during coding.

13 Claims, 15 Drawing Sheets

(56) References Cited

U.S. PATENT DOCUMENTS

Figure 1:
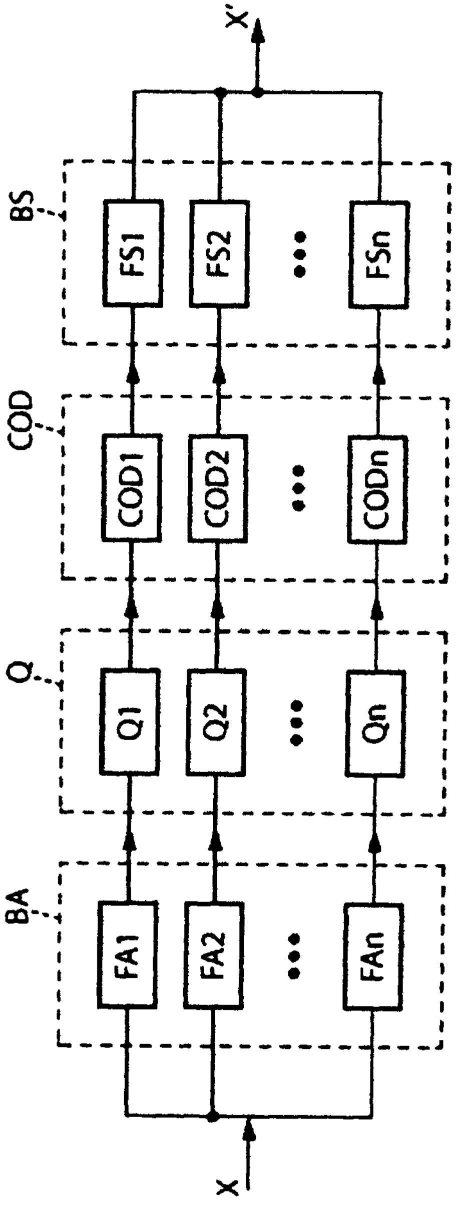

| | | | | | |
|---|---|---|---|---|---|
| 5,285,498 | A * | 2/1994 | Johnston | 381/2 |
| 5,347,478 | A * | 9/1994 | Suzuki et al. | 708/203 |
| 5,361,278 | A | 11/1994 | Vaupel et al. | |
| 5,384,891 | A * | 1/1995 | Asakawa et al. | 704/220 |
| 5,398,254 | A * | 3/1995 | Miya et al. | 714/795 |
| 5,444,741 | A * | 8/1995 | Mahieux | 375/254 |
| 5,689,800 | A * | 11/1997 | Downs | 725/114 |
| 5,787,391 | A * | 7/1998 | Moriya et al. | 704/225 |
| 5,848,391 | A * | 12/1998 | Bosi et al. | 704/200.1 |
| 5,987,413 | A * | 11/1999 | Dutoit et al. | 704/267 |
| 6,339,804 | B1 * | 1/2002 | Shimoda et al. | 710/68 |
| 6,408,267 | B1 * | 6/2002 | Proust | 704/210 |
| 6,453,282 | B1 * | 9/2002 | Hilpert et al. | 704/200.1 |
| 6,587,816 | B1 * | 7/2003 | Chazan et al. | 704/207 |
| 6,636,830 | B1 * | 10/2003 | Princen et al. | 704/204 |
| 6,750,789 | B2 * | 6/2004 | Herre et al. | 341/50 |
| 6,885,992 | B2 * | 4/2005 | Mesarovic et al. | 704/500 |
| 6,975,254 | B1 * | 12/2005 | Sperschneider et al. | 341/107 |
| 7,177,804 | B2 * | 2/2007 | Wang et al. | 704/219 |
| 7,177,805 | B1 * | 2/2007 | Oh et al. | 704/225 |
| 7,200,561 | B2 * | 4/2007 | Moriya et al. | 704/500 |
| 7,272,551 | B2 * | 9/2007 | Sorin | 704/205 |
| 7,283,968 | B2 * | 10/2007 | Youn | 704/500 |
| 7,325,023 | B2 * | 1/2008 | Youn | 708/402 |
| 7,454,353 | B2 * | 11/2008 | Sperschneider et al. | 704/501 |
| 7,496,517 | B2 * | 2/2009 | Sperschneider et al. | 704/501 |
| 7,516,064 | B2 * | 4/2009 | Vinton et al. | 704/206 |
| 7,523,039 | B2 * | 4/2009 | Manu | 704/501 |
| 7,599,840 | B2 * | 10/2009 | Mehrotra et al. | 704/501 |
| 7,630,902 | B2 * | 12/2009 | You | 704/500 |
| 7,693,709 | B2 * | 4/2010 | Thumpudi et al. | 704/205 |
| 7,873,510 | B2 * | 1/2011 | Kurniawati et al. | 704/200.1 |
| 7,987,089 | B2 * | 7/2011 | Krishnan et al. | 704/214 |
| 8,069,034 | B2 * | 11/2011 | Makinen et al. | 704/201 |
| 8,204,744 | B2 * | 6/2012 | Wu et al. | 704/230 |
| 8,219,393 | B2 * | 7/2012 | Oh et al. | 704/224 |
| 8,244,525 | B2 * | 8/2012 | Makinen | 704/208 |
| 8,270,633 | B2 * | 9/2012 | Isaka | 381/94.2 |
| 8,494,865 | B2 * | 7/2013 | Fuchs et al. | 704/500 |
| 2001/0044919 | A1 * | 11/2001 | Edmonston et al. | 714/752 |
| 2002/0103635 | A1 * | 8/2002 | Mesarovic et al. | 704/200.1 |
| 2003/0107503 | A1 * | 6/2003 | Herre et al. | 341/50 |
| 2003/0177011 | A1 * | 9/2003 | Yasuda et al. | 704/265 |
| 2004/0049376 | A1 * | 3/2004 | Sperschneider et al. | 704/200.1 |
| 2004/0176961 | A1 * | 9/2004 | Manu et al. | 704/500 |
| 2005/0261892 | A1 * | 11/2005 | Makinen et al. | 704/200.1 |
| 2006/0031075 | A1 * | 2/2006 | Oh et al. | 704/500 |
| 2006/0173675 | A1 * | 8/2006 | Ojanpera | 704/203 |
| 2008/0059202 | A1 * | 3/2008 | You | 704/500 |
| 2009/0299757 | A1 * | 12/2009 | Guo et al. | 704/500 |
| 2009/0313009 | A1 * | 12/2009 | Kovesi et al. | 704/203 |
| 2010/0268533 | A1 * | 10/2010 | Park et al. | 704/233 |
| 2011/0224995 | A1 * | 9/2011 | Kovesi et al. | 704/500 |

OTHER PUBLICATIONS

Edler, "Coding of audio signals with overlapping block transform and adaptive window functions", Frequenz Schiele Und Schon, vol. 43, No. 9, Sep. 1, 1989, XP000052987, pp. 252-256.

* cited by examiner

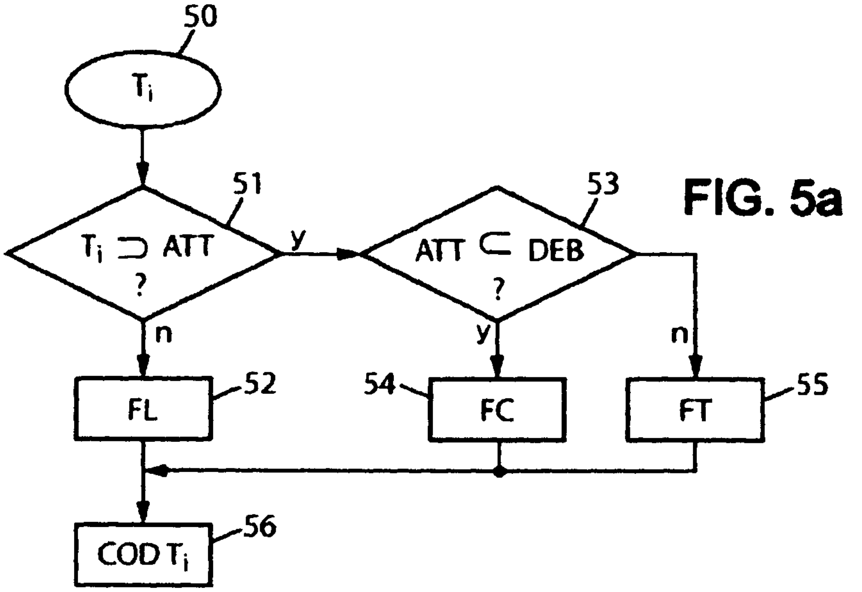
FIG. 5a
FIG. 6
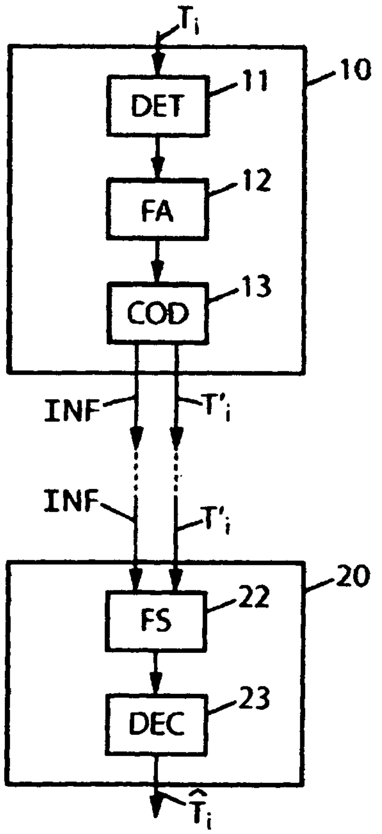

LOW-DELAY TRANSFORM CODING USING WEIGHTING WINDOWS

This application is a 35 U.S.C. §371 National Stage entry of International Application No. PCT/FR2007/052541, filed on Dec. 18, 2007, and claims the benefit of French Patent Application No. 07 00056 filed on Jan. 5, 2007 and French Patent Application No. 07 02768, filed on Apr. 17, 2007, all of which are incorporated herein by reference in its entirety.

The present invention relates to the coding/decoding of digital audio signals.

In a transform coding schema, for a data rate reduction, it is commonly sought to reduce the precision given to the coding of samples, while nevertheless ensuring that the listener perceives the lowest possible degree of degradation.

To this end, the reduction in precision, carried out by a quantification operation, is controlled using a psychoacoustic model. This model, based on knowledge of the properties of the human ear, makes it possible to adjust the quantification noise in the least-perceptible auditory frequencies.

In order to use the data from the psychoacoustic model, essentially data in the frequency domain, it is standard practice to carry out a time/frequency transform, with the quantification being performed in this frequency domain.

FIG. 1 shows diagrammatically the structure of a transform coder, with:

- a bank BA of analysis filters FA1, . . . , FAn, attacking the input signal X,
- a quantification module Q, followed by a coding module COD,
- and a bank BS of synthesis filters FS1, . . . , FSn delivering the coded signal X'.

In order to reduce the data rate before transmission, the quantified frequency samples are coded, often using a coding called "entropic" (lossless coding). The quantification is carried out in standard fashion by a scalar quantifier, uniform or not, or also by a vectorial quantifier.

The noise introduced in the quantification step is shaped by the synthesis filter bank (also called "inverse transform"). The inverse transform, associated with the analysis transform, must therefore be chosen so as to effectively concentrate the quantification noise, by frequency or time, in order to avoid it becoming audible.

The analysis transform must concentrate the signal energy as far as possible in order to allow an easy sample coding in the transformed domain. In particular, the transform coding gain, which depends on the input signal, must be maximized as far as possible. To this end a relationship can be used of the type:

$$\mathrm{SNR}=G_{TC}+K\cdot R$$

where K is a constant term, the value of which can advantageously be 6.02.

Thus, the signal-to-noise ratio (SNR) obtained is proportional to the number of bits per sample selected (R) increased by the component $G_{TC}$ which represents the transform coding gain. The greater the coding gain is, the higher the reconstruction quality is.

The importance of coding transform can therefore be understood. It allows the easy coding of samples, due to its ability to concentrate both the signal energy (by the analysis part) and the quantification noise (by the synthesis part).

As audio signals are well known to be non-stationary, it is appropriate to adapt the time/frequency transform over time, as a function of the nature of the audio signal.

Some applications to standard coding techniques are described below.

In the case of modulated transforms, the standard audio coding techniques integrate cosine-modulated filter banks which make it possible to implement these coding techniques using rapid algorithms based on cosine transforms or fast Fourier transforms.

Among transforms of this type, the most commonly-used transform (in MP3, MPEG-2 and MPEG-4 AAC coding in particular) is the MDCT transform (Modified Discrete Cosine Transform) the expression for which is given below:

$$X_k^t = \sum_{n=0}^{2M-1} x_{n+tM}\, p_k(n)$$

$$0 \le k < M$$

with the following notations:

M represents the size of the transform.

$x_{n+tM}$ are the samples of the sound digitized at a period $$\frac{1}{F_e}$$

(inverse of the sampling frequency) at the moment in time n+tM, t is the frame index.

$X_k^t$ are the samples in the field transformed for the frame t, $$p_k(n) = \sqrt{\frac{2}{M}}\, h(n)\cos\left[\frac{\pi}{4M}(2n+1+M)(2k+1)\right]$$

is a base function of the transform of which h(n) is called prototype filter of size 2M.

In order to reconstruct the initial temporal samples, the following inverse transform is applied in order to reconstruct the samples 0≤n≤M−1:

$$\hat{x}_{n+tM} = \sum_{k=0}^{M-1} \left[X_k^{t+1} p_k(n) + X_k^t p_k(n+M)\right]$$

Figure 1A:
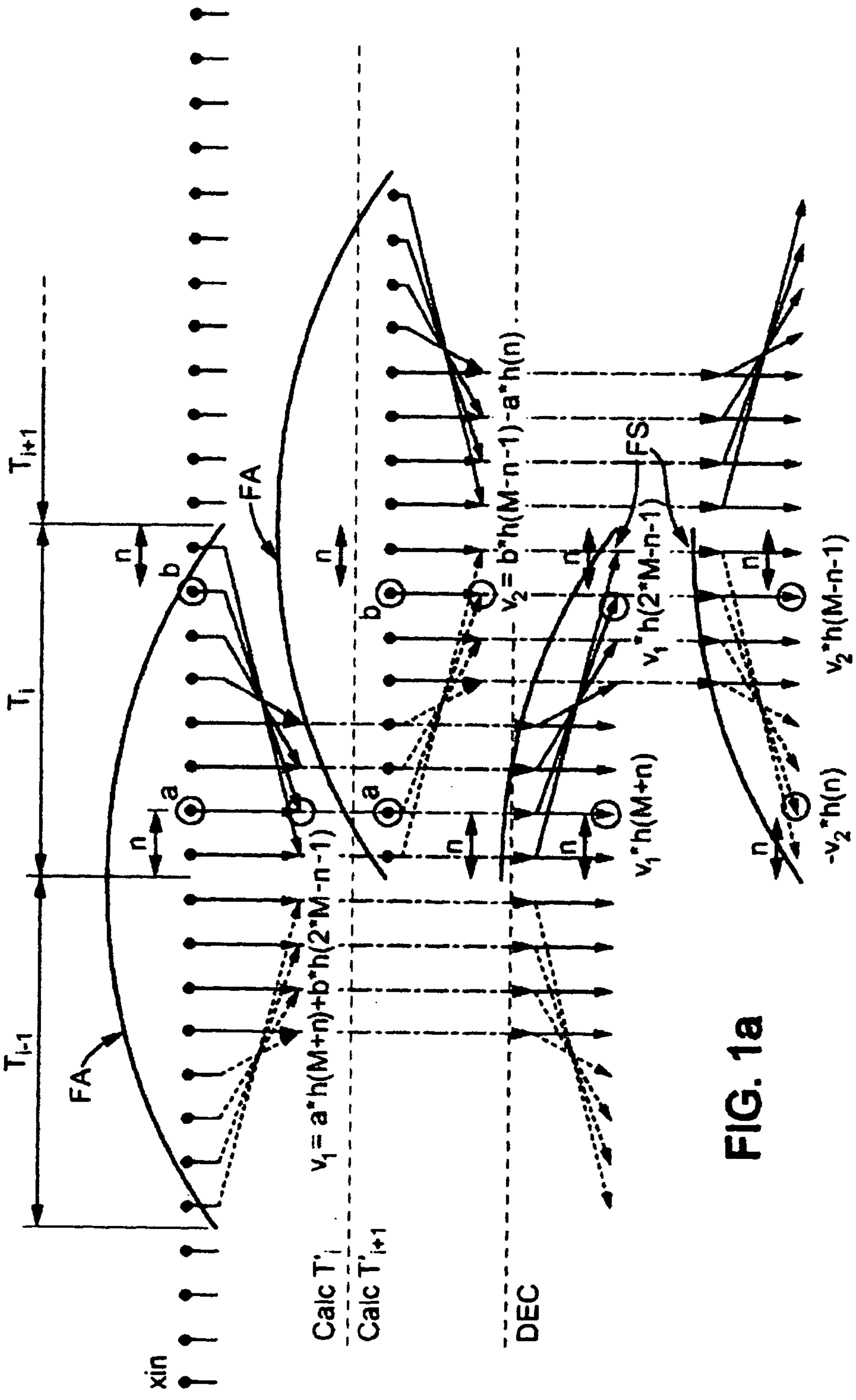

With reference to FIG. 1*a*, the reconstruction is carried out as follows:

- inverse DCT transform (hereafter denoted $DCT^{-1}$) of the samples $X_k^t$ producing 2M samples,
- inverse DCT transform of the samples $X_k^{t+1}$ producing 2M samples, the first M samples having a temporal support identical to the last M samples of the previous frame,
- weighting by the synthesis window h(M+n) for the second half of the frame $T_i$ (last M samples), and by the synthesis window h(n) for the first half of the following frame $T_{i+1}$ (first M samples), and
- additions of the windowed components on the common support.

In order to ensure the exact reconstruction (called perfect) of the signal (according to the condition $\hat{x}_{n+tM}=x_{n+tM}$, it is appropriate to choose a prototype window h(n) satisfying a number of constraints.

Typically, the following relationships are satisfactory in order to allow a perfect reconstruction:

$$\begin{cases} h(2M-1-n) = h(n) \\ h^2(n) + h^2(n+M) = 1 \end{cases}$$

the windows having an even symmetry with respect to a central sample.

It is relatively simple to satisfy these two simple constraints and to this end, a standard prototype filter is constituted by a sinusoidal window which is written as follows:

$$h(n) = \sin\left[\frac{\pi}{2M}(n+0.5)\right]$$

Of course, other forms of prototype filters exist, such as the windows defined in the standard MPEG-4 under the name of "Kaiser Bessel Derived" (or KBD), or also low overlap windows.

Figure 1B:
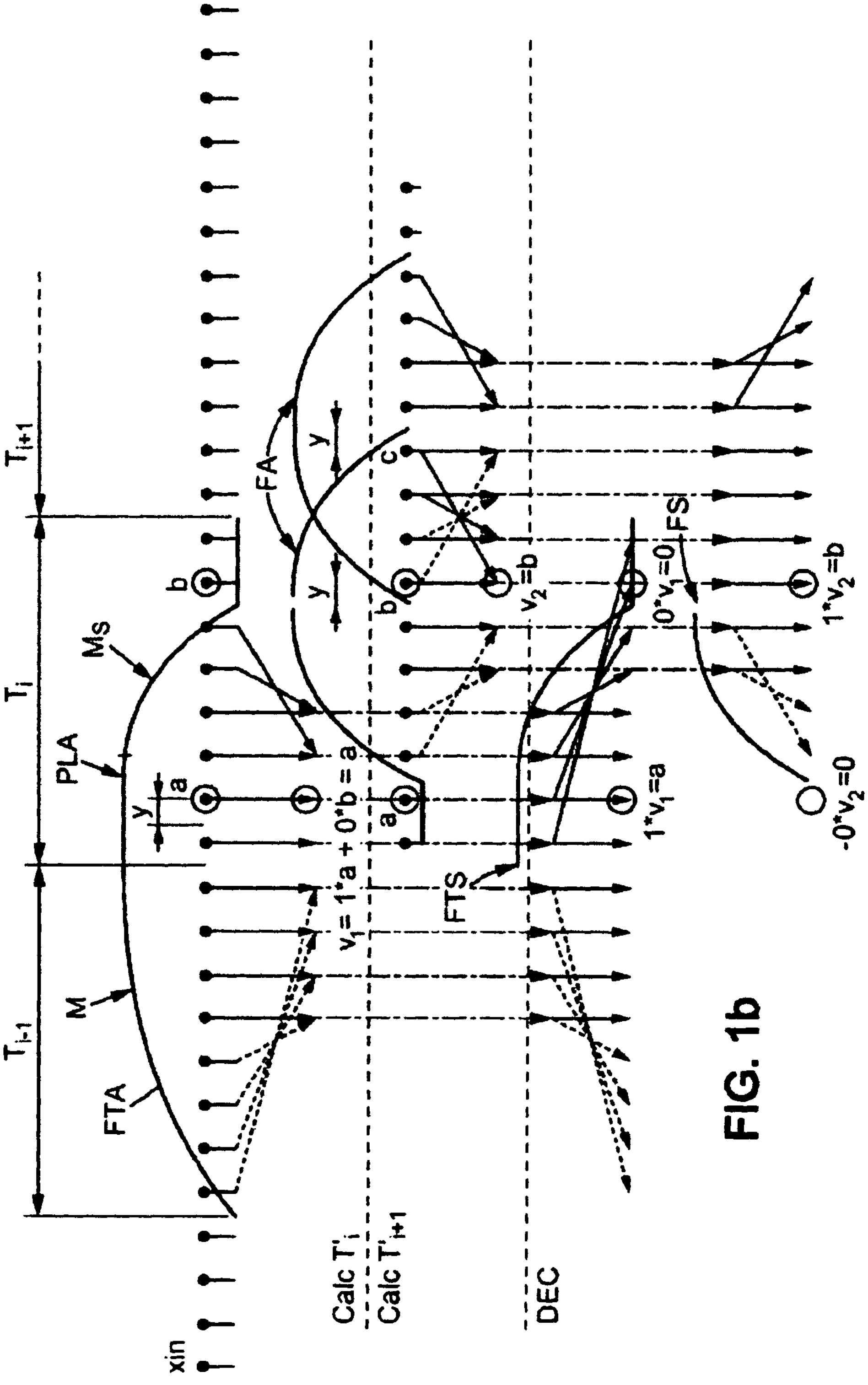
Figure 1C:
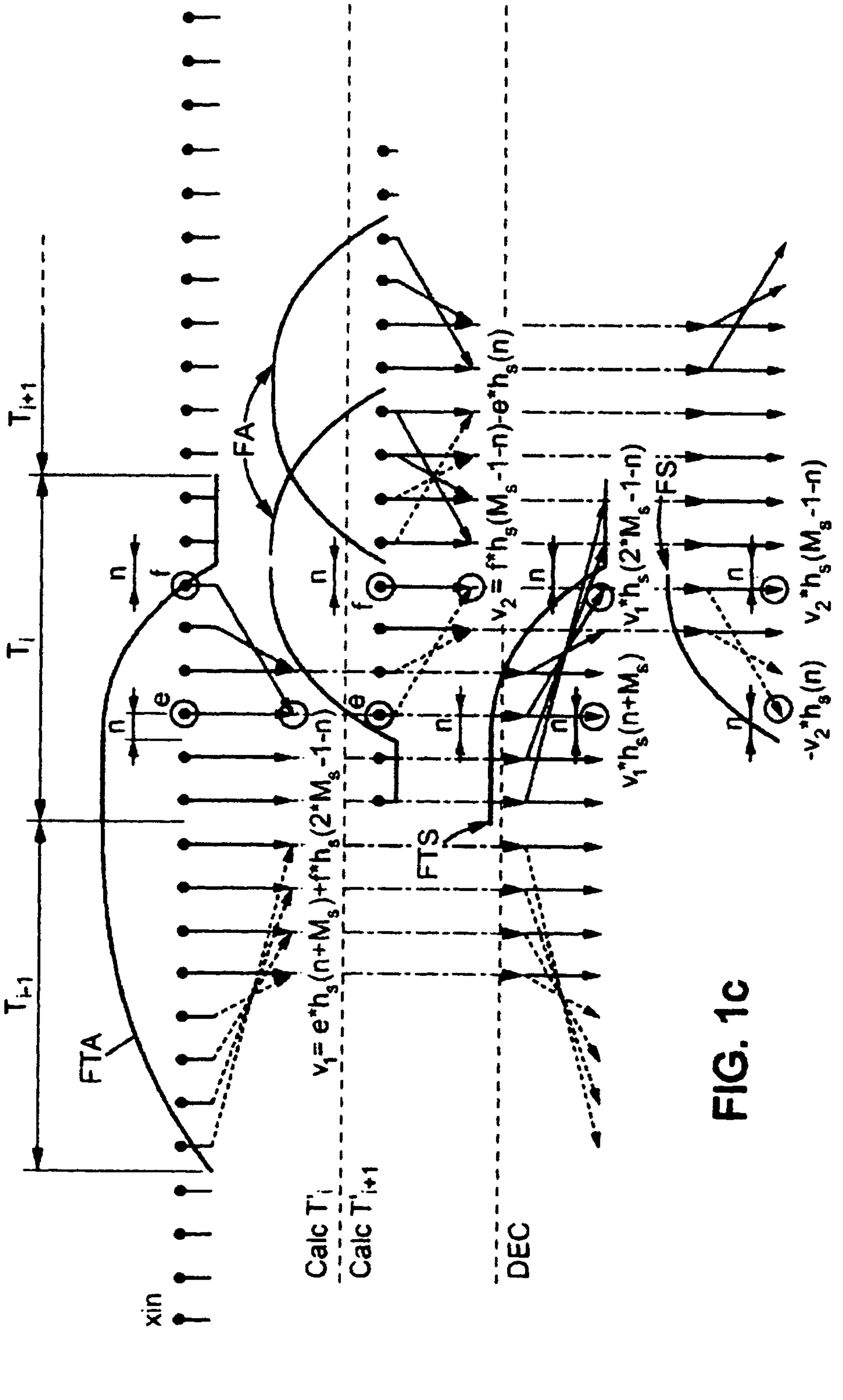

An example of processing by an MDCT transform, with long windows, is given in FIG. 1*a*. In this Figure:

- the arrows with broken lines illustrate a subtraction,
- the arrows with solid lines illustrate an addition,
- the arrows with dotted and dashed lines illustrate a DCT process for coding and a $DCT^{-1}$ process for decoding DEC, this DCT term corresponding to a cosine term of the base function given above,
- the samples of the signal to be coded are in a flow marked xin, and the development of the coding/decoding processing of particular samples circled and referenced a and b in FIGS. 1*b* and *e* and *f* in FIG. 1*c* is followed,
- the xin samples are grouped by frames, a current frame is marked $T_i$ the previous and following frames being marked respectively $T_{i-1}$ and $T_{i+1}$,
- the reference DEC relates to the processing carried out by the decoder (using synthesis windows FS with addition-reconstruction),
- the analysis windows are marked FA and the synthesis windows are marked FS,
- n is the distance between the middle of the window and the sample a.

The reference calc $T'_i$ relates to the calculation of the coded frame $T'_i$ using the analysis window FA and the respective samples of the frames $T_{i-1}$ and $T_i$. Here, this is simply a conventional example illustrated in FIG. 1*a*. It could also be decided, for example, to index the frames $T_i$ and $T_{i+1}$ for calculating a coded frame $T'_i$. Following the example in FIG. 1*a*, the reference calc $T'_{i+1}$ relates to the calculation of the coded frame $T'_{i+1}$, using the respective samples of the frames $T_i$ and $T_{i+1}$.

The terms v1 and v2 obtained before transform DCT and inverse transform $DCT^{-1}$ are obtained with equations of the type:

$$v1 = a*h(M+n) + b*h(2*M-1-n), \text{ and}$$

$$v2 = b*h(M-1-n) - a*h(n)$$

Thus, after global $DCT/DCT^{-1}$ processing and synthesis window, the reconstruction terms a' and b' are written:

$$a' = v1*h(M+n) - v2*h(n) = a*h(M+n)*h(M+n) + b*h(2*M-1-n)*h(M+n) - b*h(M-1-n)*h(n) + a*h(n)*h(n),$$

and $$b' = v1*h(2*M-1-n) + v2*h(M-1-n) = a*h(M+n)*h(2M-n-1) + b*h(2*M-1-n-1)*h(2M-n-1) + b*h(M-1-n)*h(M-1-n) - a*h(n)*h(M-1-n)$$

and thus it is possible to verify that the reconstruction is perfect (a'=a and b'=b).

(by using the relationships (1) and by deducting h(M−1−n)=h(n+M))

The above-described principle of an MDCT transform extends naturally to transforms called ELT ("Extended Lapped Transform"), in which the order of the base functions is greater than twice the size of the transform, with in particular:

$$X_k^t = \sum_{n=0}^{L-1} x_{n+tM}\, p_k(n)$$

where $0 \le k < M$ and $L = 2KM$, K being a positive integer greater than 2.

For the reconstruction, instead of linking two consecutive frames as for an MDCT transform, the synthesis of the samples involves K windowed successive frames.

Moreover, it is indicated that the constraint of symmetry of the windows (a principle described in detail below) can be relaxed for an ELT-type transform. The constraint of the identity between the analysis and synthesis windows can also be relaxed, allowing the term biorthogonal filters to be used.

Taking account of the need to adapt the transform to the signal to be coded, the prior art allows what is called "window switching", i.e. changing the size of the transform used over time.

The need to change window length can be justified in particular in the following case. When the signal to be coded, for example a speech signal, comprises a transitory (non stationary) signal characterizing a strong attack (for example the pronunciation of a "ta" or "pa" sound characterizing a plosive in the speech signal), it is appropriate to increase the temporal resolution of the coding and thus to reduce the size of the coding windows, which therefore requires passing from a long window to a short window. More exactly, in the prior art, the passing occurs in this case from a long window (FIG. 2*a* which will be described below) to a transition window (FIG. 2*c* described below), then to a series of short windows (FIG. 2*b* described below). It is therefore necessary to anticipate an attack on at least one following frame, as will be seen in detail below, to before being able to decide the length of the coding window of a current frame, and, as a result, coding the current frame.

An example of a change of window length within the meaning of the prior art is shown below.

A typical example is changing the size of an MDCT transform of size M to a size M/8, as specified in standard MPEG-AAC.

In order to retain the property of perfect reconstruction, equation (1) above must be replaced by the following formulae at the time of the transition between two sizes:

$$\begin{cases} h^2(n) + h^2(M-n) = 1 & \text{for } 0 \le n < M \\ h^2(M+n) + h^2(2M-n) = 1 & \text{if not} \end{cases}$$

A relationship is given moreover for the consecutive prototype filters of different sizes:

$$h_1(M+M/2-M_s/2+n) = h_2(M_s-n)\, 0 \le n < M_s$$

A symmetry therefore exists about the size M/2 at the time of the transition.

Figure 2A:
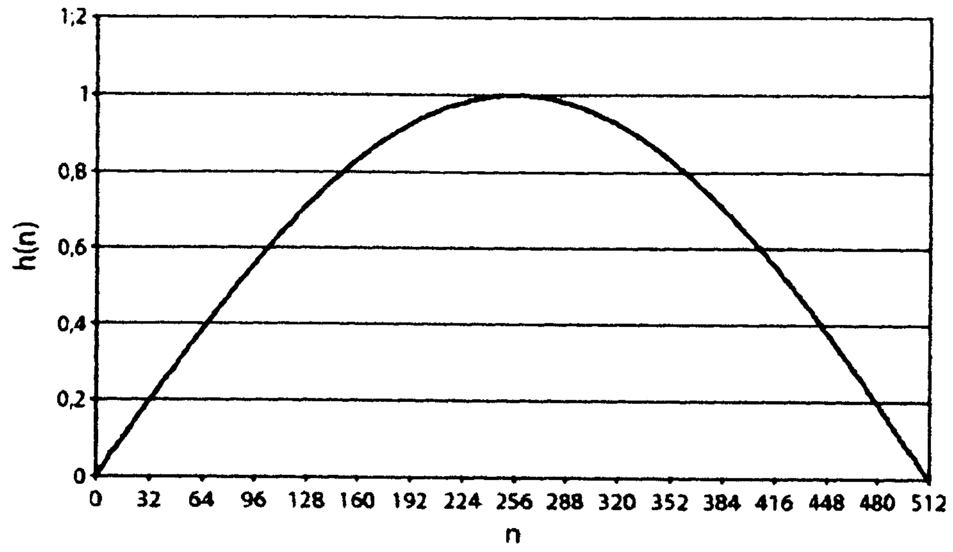
Figure 2B:
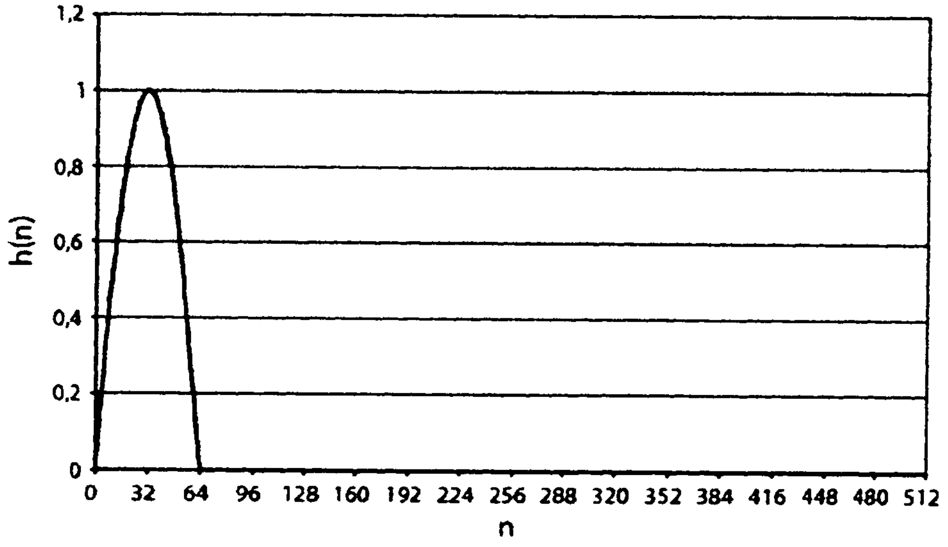
Figure 2C:
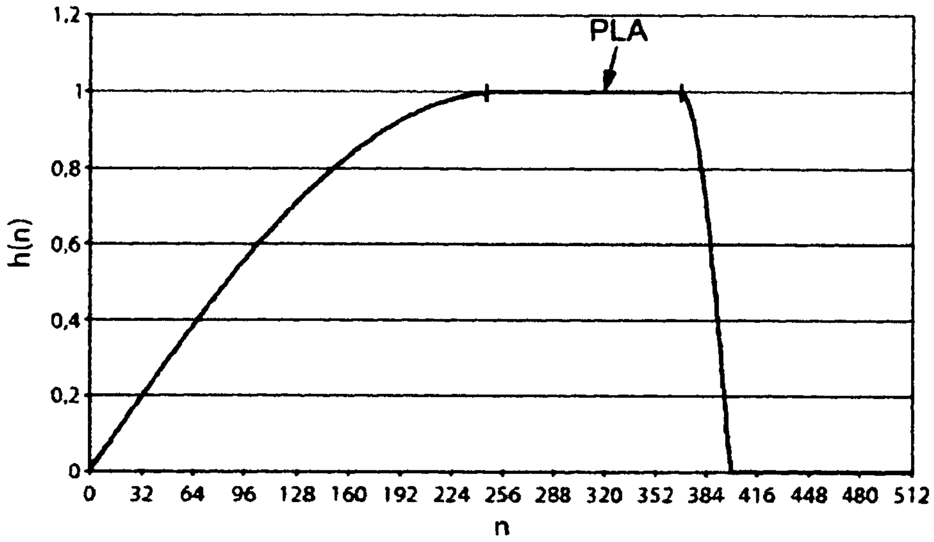
Figure 2D:
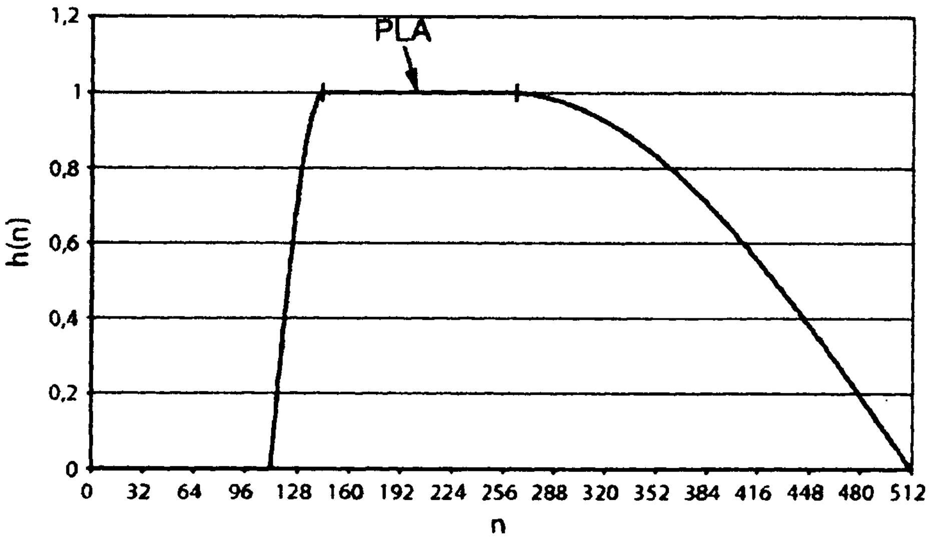
Figure 2E:
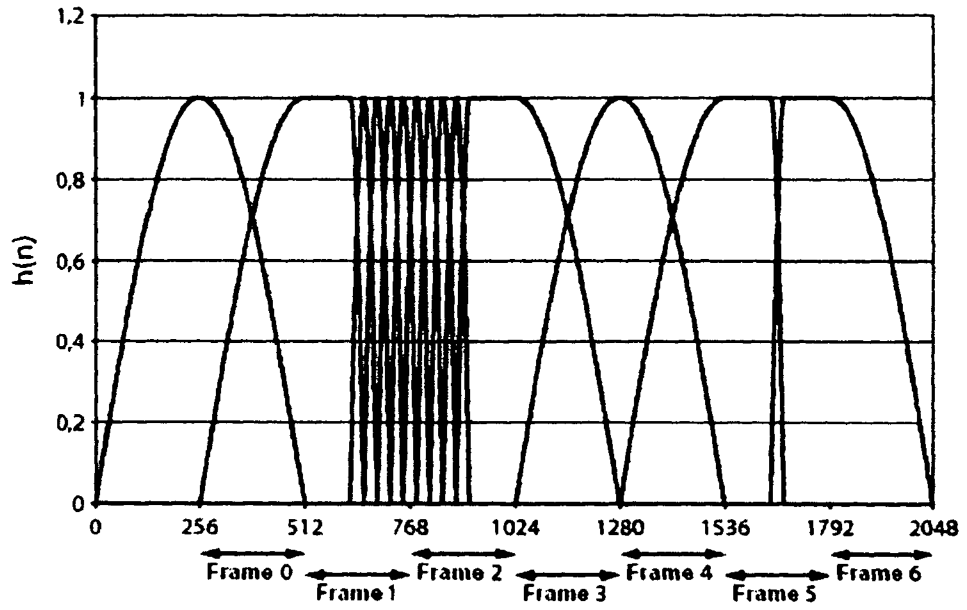

Different types of window are illustrated in FIGS. 2a to 2e, with respectively:

- a sinusoidal window (symmetrical sine function) of size 2M=512 samples for FIG. 2a,
- a sinusoidal window (symmetrical sine function) of size 2Ms=64 samples for FIG. 2b,
- a transition window making it possible to pass from a size 512 to 64 for FIG. 2c,
- a transition window making it possible to pass from a size of 64 to 512 for FIG. 2d,
- and a example of a construction carried out using the base windows presented above, for FIG. 2e.

Each succession has a predetermined "length" defining what is called the "window length". Thus, samples to be coded are combined, at least in pairs, and weighted, in the combination, by respective weighting values of the window, as has been shown with reference to FIG. 1a.

More particularly, the sinusoidal windows (FIGS. 2a and 2b) are symmetrical, i.e. the weighting values are approximately equal on each side of a central value in the middle of the succession of values forming the window. An advantageous embodiment consists of choosing "sine" functions to define the weighting value variations of these windows. Other window choices are still possible (for example those used in MPEG AAC coders).

It will be shown however that the transition windows (FIGS. 2c and 2d) are asymmetrical and comprise a "flat" region (reference PLA), which means that the weighting values in these regions are maximal and for example are equal to "1". As will be seen with reference to FIGS. 1b and 1c, by using a transition window from a long window to a short window (FIG. 2c), two samples (in the example shown in FIG. 1b), including sample a, are simply weighted by a factor "1", while sample b is weighted by the factor "0" in the calculation of the coded frame $T'_i$, so that the two samples including sample a are simply transmitted as they are (with the exception of the DCT) in the coded frame $T'_i$.

The use of a variable-size transform in a coding system is described below. Operations are also described at the level of a decoder for reconstructing the audio samples.

In standard systems, the coder habitually selects the transform to be used over time. Thus in the AAC standard, the coder transmits two bits, making it possible to select one of the four window size configurations given above.

The MDCT transform processing using the transition windows (long-short) is illustrated in FIGS. 1b and 1c. These figures represent the calculations carried out, in the same way as for FIG. 1a.

In FIGS. 1b and 1c, only a few short analysis windows are shown, referenced FA (with Ms=M/2 in the example illustrated). However in reality, as illustrated in FIG. 2e, a succession of several short windows is provided (typically with Ms=M/8). It is understood therefore that each window FA in FIGS. 1b and 1c in reality encompasses to a succession of short windows.

The transition window FTA (FIG. 1b), for calculating the coded frame $T'_i$ (reference calc $T'_i$ comprises:

- a long half-window over M samples, on its rising edge, and, on its falling edge:
  - a first flat region PLA (with weighting values equal to 1) over (M/2−Ms/2) samples,
  - a falling short half-window over Ms samples, and
  - a second flat region (with weighting values equal to 0) over (M/2−Ms/2) samples.

For calculating the following coded frame $T'_{1+i}$ (reference calc $T'_{1+i}$) the first (M/2−Ms/2) samples are ignored and therefore not processed by the short windows, the following Ms samples are weighted by the rising edge of the short analysis window FA as shown in FIGS. 1b and 1c, and the following Ms samples are weighted by its falling edge.

The following notations are used below:

M is the size of the long frame, $M_s$ is the size of the short frame.

In FIG. 1b, the sample b is synthesized by using only the short windows in order to respect the analogy with the calculation for the long windows. Then, due to the particular form of the long-short transition half-window, the sample a is reconstructed directly from the analysis and synthesis transition windows. The transition window is marked FTA in FIGS. 1b and 1c.

In FIG. 1c, the samples corresponding to the transition zone between the long-short window and the short window are calculated. By analogy with the calculation for the long windows in FIG. 1a, here the processing of the samples marked e and f (encircled) is followed.

Two examples of window transition situations are described below.

In a first example, an attack is detected requiring the use of short windows in the audio signal audio at a time t=720 (FIG. 2e). The coder must inform the decoder of the use of long-short transition windows to be interposed between the long windows previously used and the subsequent short windows.

Thus, the coder successively indicates to the decoder the sequences:

long window
long-short transition window
short window
long-short transition window
long window.

The decoder then applies a relationship of type:

$$\hat{x}_{n+tM} = \sum_{k=0}^{M-1} [X_k^{t+1} p_k^t(n) + X_k^t p_k^s(n+M)]$$

where $p_k^t$ and $p_k^s$ represent the synthesis functions of the transforms at time t and t+1, which can be different from each other.

The reconstruction is carried out as previously, with the exception that if the basis functions $p_k^t$ and $p_k^s$ have different "sizes", then with reference to FIG. 1b, the following is carried out:

- an inverse DCT transform of size M of the samples $X_k^t$ producing 2M samples,
- an inverse DCT transform of size Ms of the samples $X_k^{t+1}$ producing 2Ms samples, the first Ms samples having a common time support of length Ms in an overlap zone comprising the rising part of the short window, with the samples originating from the inverse DCT transform of size M of the falling part of the transition window FTA,
- a multiplication by the dual synthesis window of the transition window FTA and referenced FTS in FIG. 1b, for the first half, and a to multiplication by the short synthesis window FS for the second half, and
- the additions of these windowed components over the overlap zone, the time support corresponding to part of the end of the initial frame Ti.

The decoder is therefore slave to the coder and reliably applies the types of window decided by the coder.

In this first example, the coder detects a transition during the arrival of samples of a first frame (for example frame 1 in FIG. 2e, comprising the samples between the times t=512 and t=767). The coder can then decide that the current window must be a long-short transition window, encoded, transmitted and signalled to the decoder. Then eight short windows are successively applied between samples t=624 and t=911. Thus, at the time of the transition (t=720), the encoder uses the short windows, which allows an improved time representation of the signal.

In a second example, a transition is detected at sample t=540. When the coder receives the samples of a first frame (the frame 0 in FIG. 2*e* for example), it does not detect a transition and therefore selects a long window. During the arrival of the samples of a second following frame (frame 1 in the example in FIG. 2*e*), the coder detects an attack (at time t=540). In this case then, the detection is carried out too late and the use of a transition window does not make it possible to benefit from the use of short time supports (short windows) at the moment of the attack. The coder should then expect the use of short windows and, as a result, insert an additional coding delay corresponding to at least M/2 samples.

It will thus be understood that a drawback of the known prior art resides in the fact that it is necessary to introduce an additional delay to the encoder in order to make it possible to detect an attack in the time signal of a following frame and thus to anticipate passing to short windows. This "attack" can correspond to a high-intensity transitory signal such as a plosive, for example, in a speech signal, or also to the occurrence of a percussive signal in a music sequence.

In certain telecommunications applications, the additional delay required for detection of transitory signals, and the use of transition windows is not acceptable. Thus, for example, in the MPEG-4 AAC Low Delay coder, short windows are not used, only long windows being permitted.

The present invention offers an improvement on the situation.

It relates to a transition between windows which does not require the introduction of an additional delay.

To this end it envisages a method of transform coding/decoding of a digital audio signal represented by a succession of frames, in which:

- at least two weighting windows are provided having different respective lengths, and
- a short window is used for coding a frame in which a particular event has been detected.

This particular event can be for example a non-stationary phenomenon such as a strong attack present in the digital audio signal which the current frame contains.

More particularly, for the coding of a current frame, it is sought to detect the particular event in this current frame, and:

- at least if the particular event is detected at the beginning of the current frame, a short window is applied for coding the current frame,
- while if the particular event is not detected in the current frame, a long window is applied for coding the current frame.

These steps are reiterated for a following frame, so that it is possible, within the meaning of the invention, to code a given frame by using a long window and to code a frame immediately following this given frame by directly afterwards using a short window, without using a transition window as in the prior art.

By making it possible to pass directly from a long window to a short window, the detection of the particular event can be carried out directly on the frame being coded and no longer on the following frame as in the prior art. Thus a coding carried out by the method within the meaning of the invention is performed without additional delay compared to an MDCT transform of fixed size, unlike the codings of the prior art.

Figure 3A:
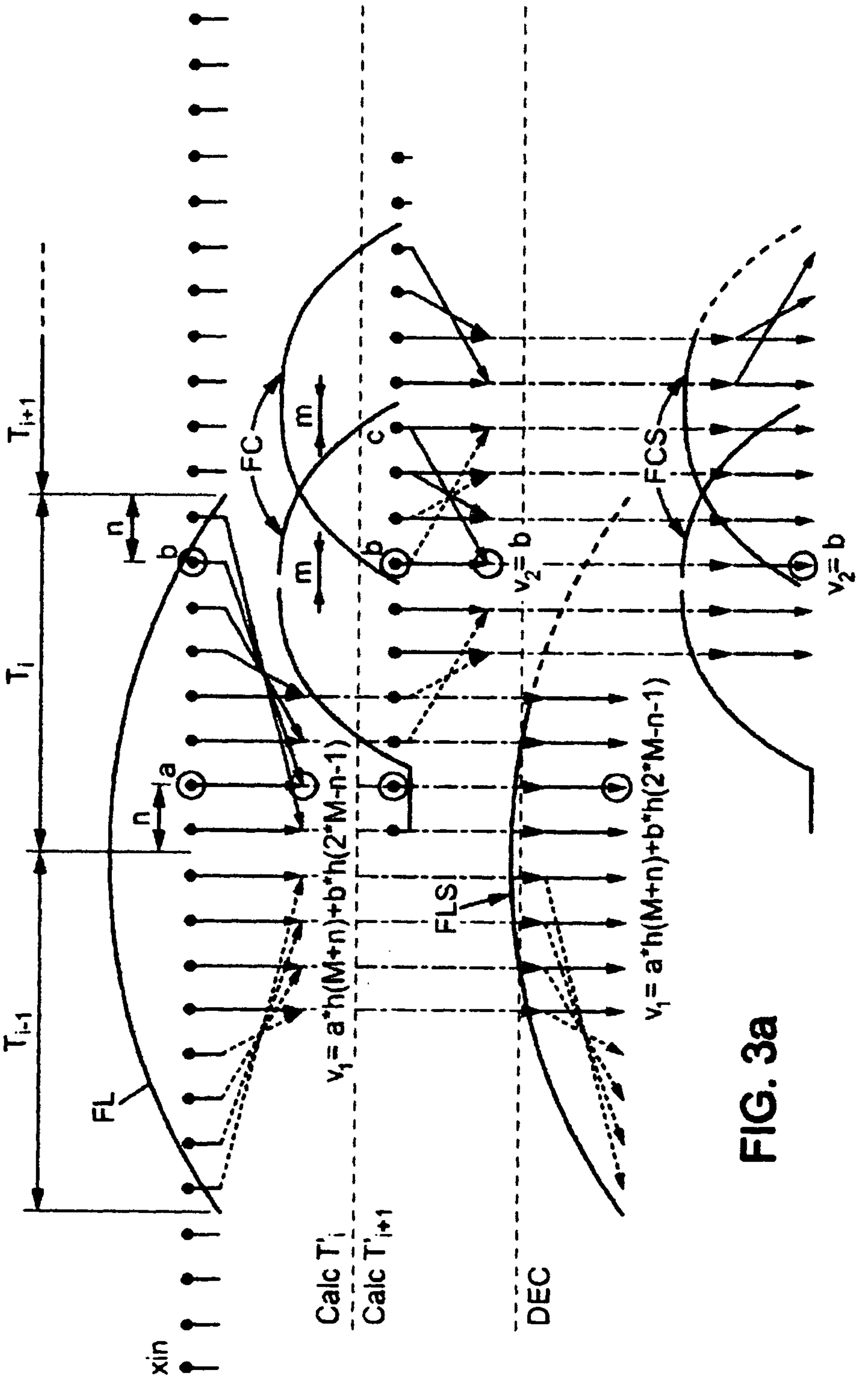
Figure 4A:
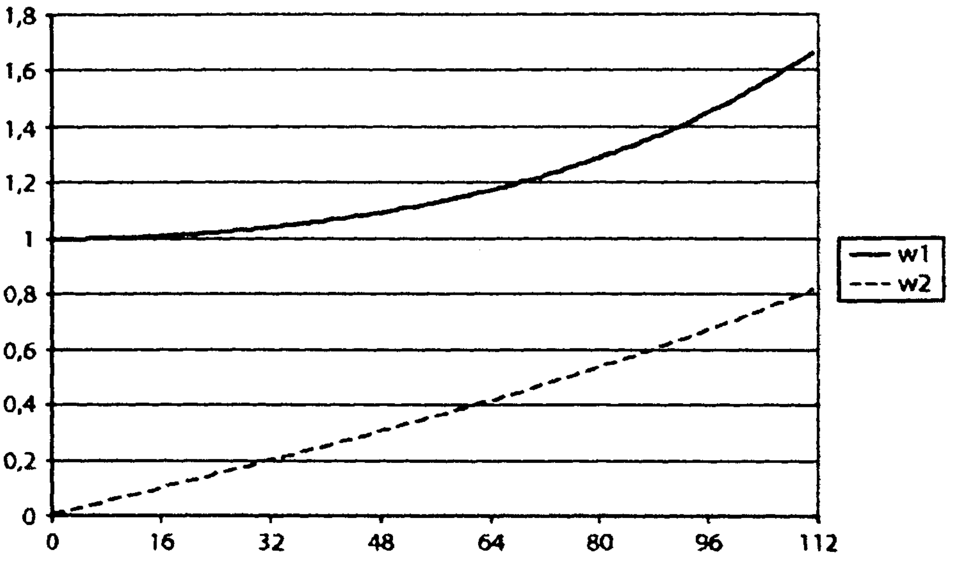
Figure 4B:
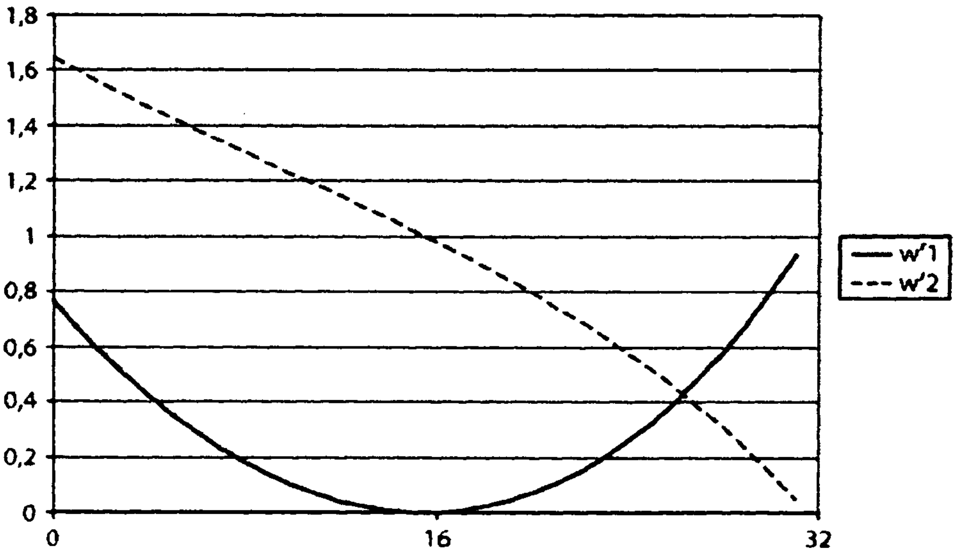
Figure 5B:
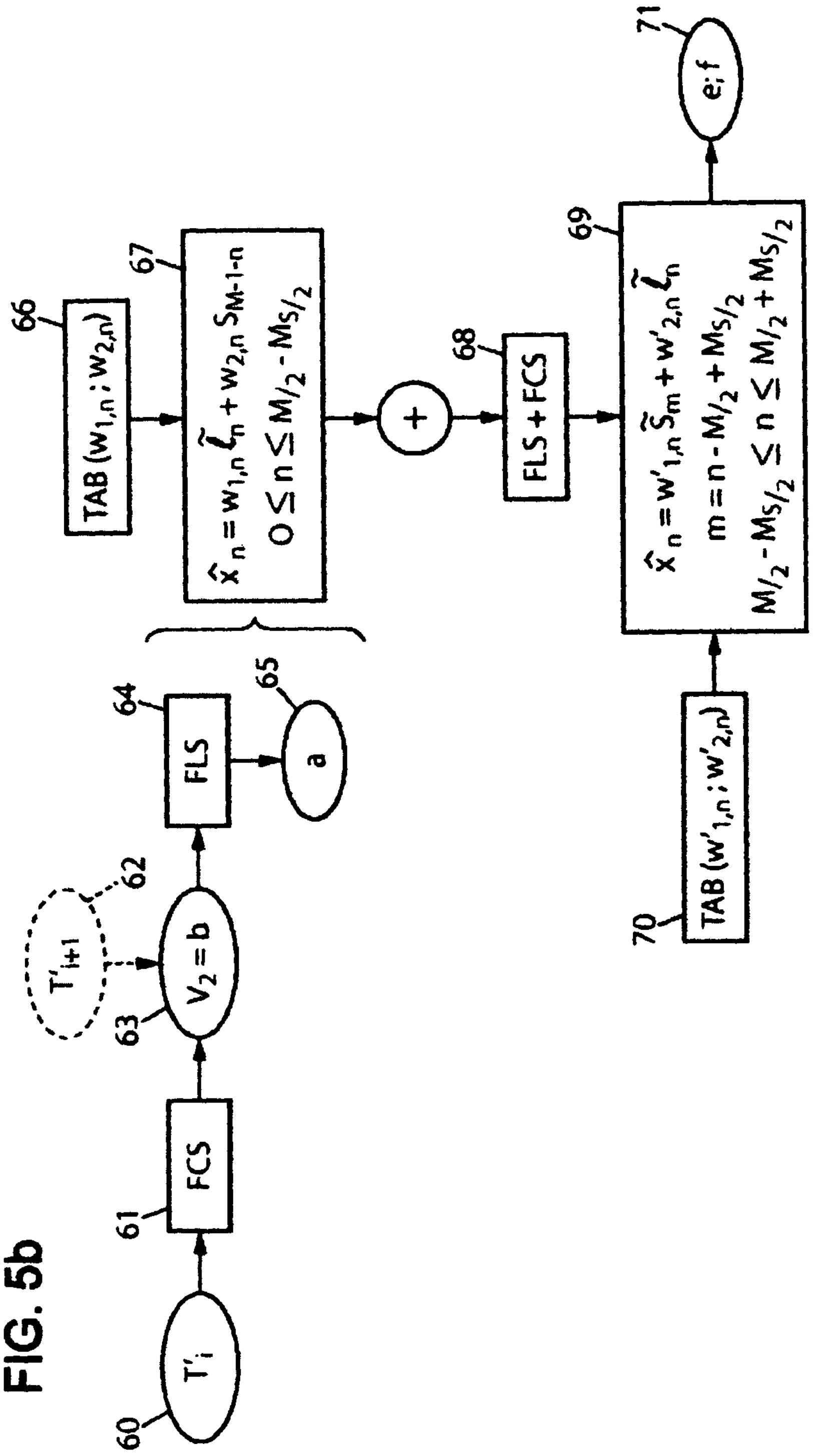
Figure 7:
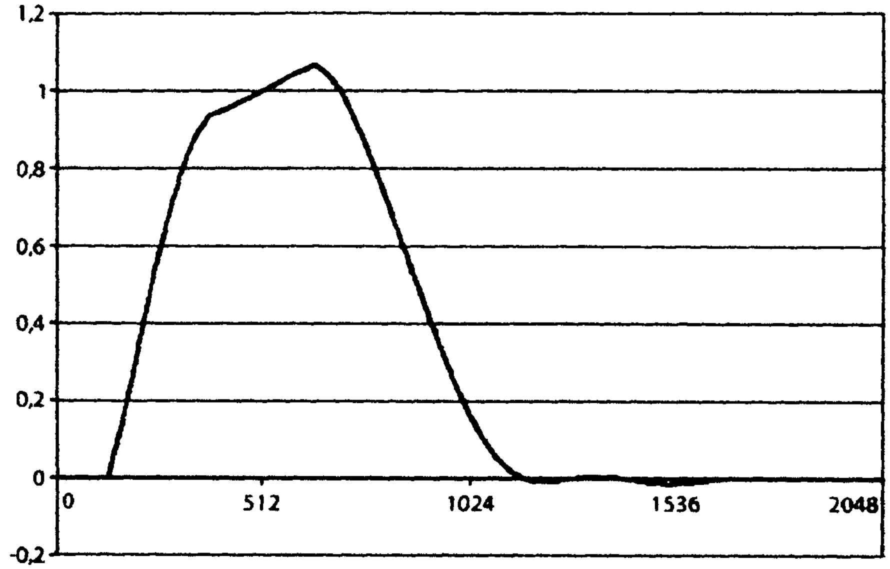
Figure 8:
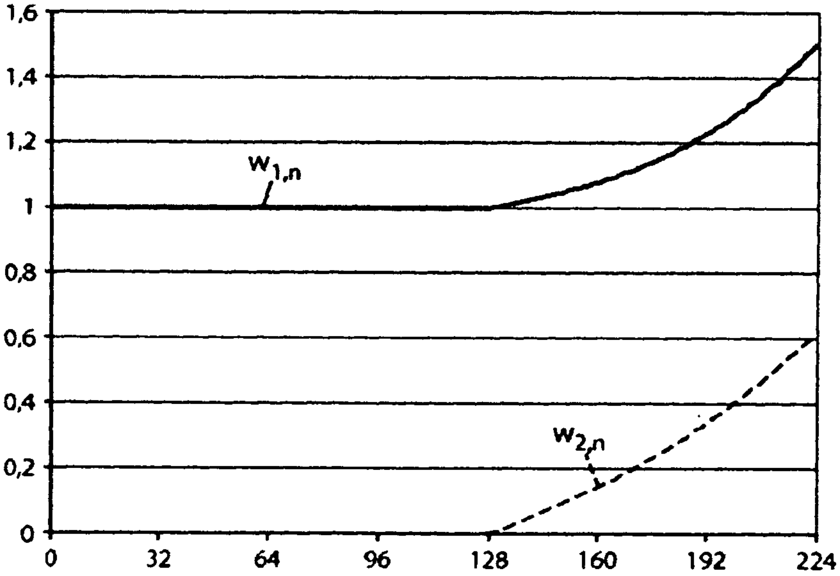
Figure 9:
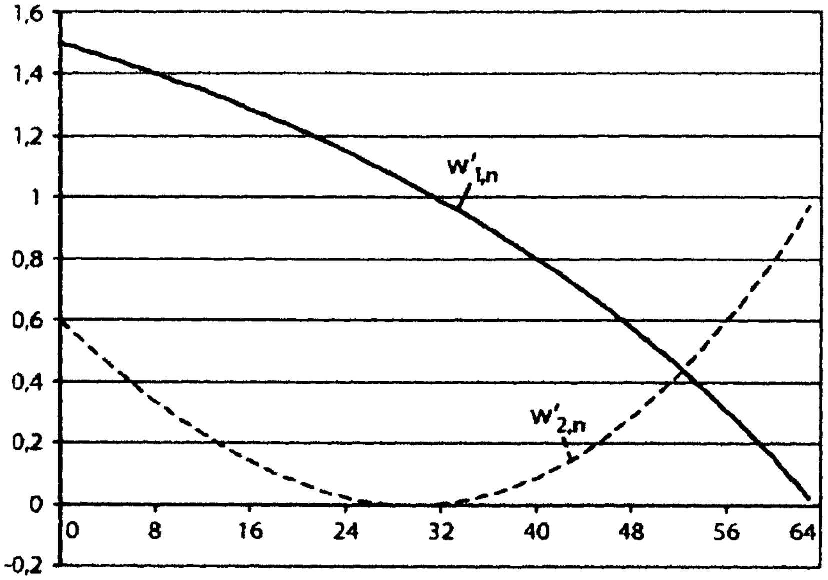
Figure 10:
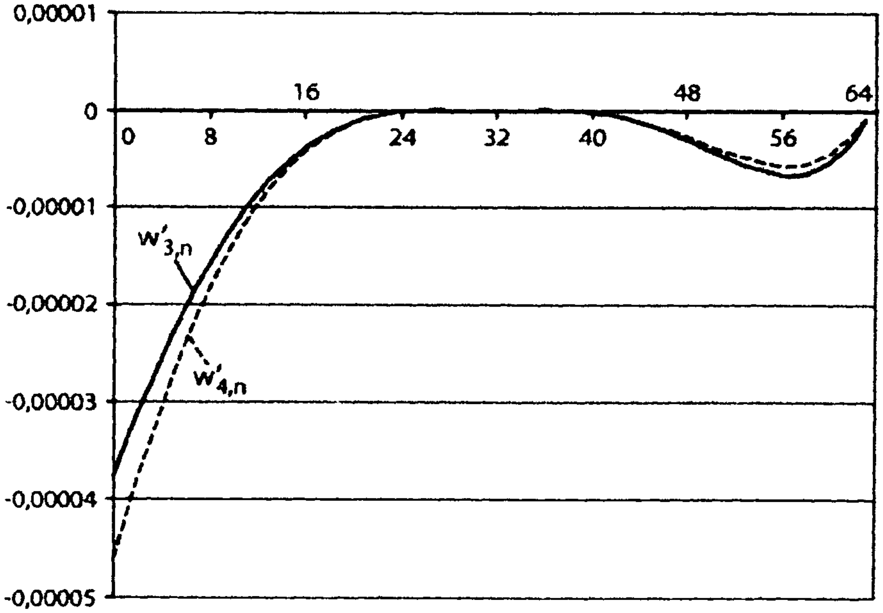
Figure 11:
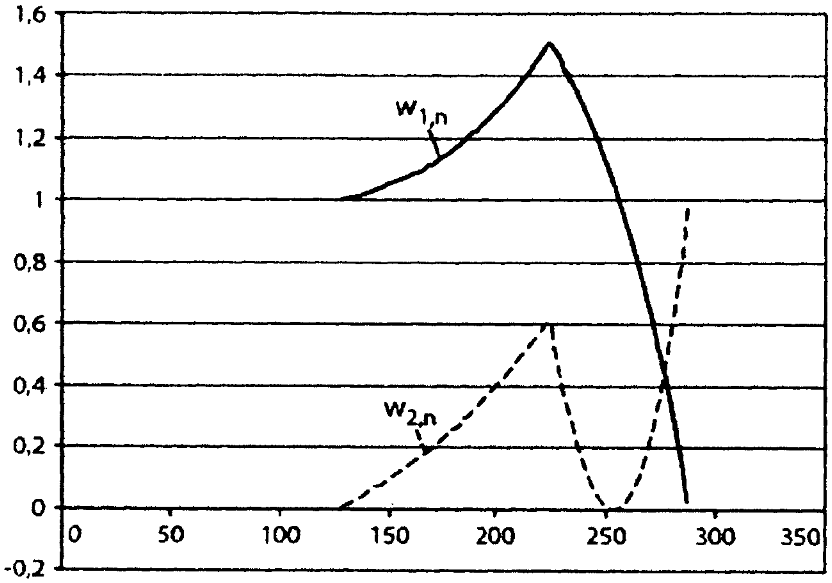
Figure 12:
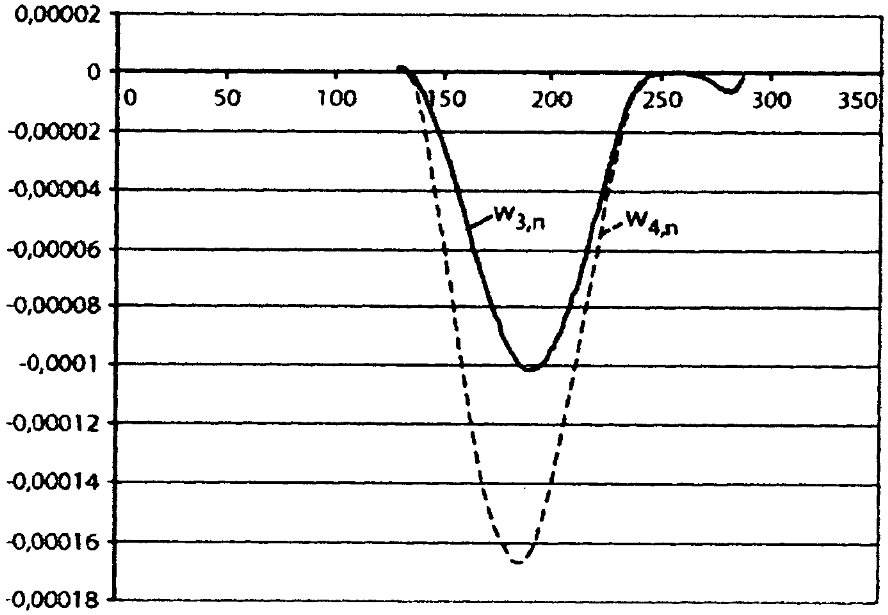

Other characteristics and advantages of the invention will become apparent on examining the detailed description below and the attached drawings in which, apart from FIGS. 1, 1*a*, 1*b*, 1*c*, 2*a*, 2*b*, 2*c*, 2*d*, 2*e*, relating to the prior art and described above:

FIG. 3*a* shows diagrammatically a coding/decoding processing within the meaning of the invention, following the development of samples a and b, as in FIG. 1*b* described previously, FIG. 3*b* diagrammatically shows a coding/decoding processing within the meaning of the invention, following the development of samples e and f, as in FIG. 1*c* described previously, and FIGS. 4*a* and 4*b* illustrate examples of variation of the weighting functions used for the compensation on decoding, carried out in the implementation of the invention, FIG. 5*a* illustrates an example of processing which can be applied in a coder within the meaning of the invention, FIG. 5*b* illustrates an example of processing which can be applied in a decoder within the meaning of the invention, and FIG. 6 illustrates the respective structures of a coder and a decoder and the communication of the information of the type of window used in the coding;

FIG. 7 illustrates a long synthesis window for the case of an ELT transform having M=512 components and an overlap coefficient K=4, FIG. 8 represents the appearance of the weighting functions $w_{1,n}$ and $w_{2,n}$ (for n comprised between 0 and M/2−Ms/2) in an embodiment where account is taken of the influence of past samples in a context of coding with overlap, FIG. 9 represents the appearance of the weighting functions $w'_{1,n}$ and $w'_{2,n}$ (for n comprised between M/2−Ms/2 and M/2+Ms/2) in this embodiment, FIG. 10 represents the appearance of the weighting functions $w'_{3,n}$ and $w'_{2,n}$ (for n comprised between M/2−Ms/2 and M/2+Ms/2) in this embodiment, FIG. 11 represents the appearance of the weighting functions $w_{1,n}$ and $w_{2,n}$ over the whole range of n comprised between 0 and M/2+Ms/2 in a variant of the to embodiment shown in FIG. 8, FIG. 12 represents the appearance of the weighting functions $w_{3,n}$ and $w_{4,n}$ over the whole range of n comprised between 0 and M/2+Ms/2 in this variant.

The present invention makes it possible to avoid to apply transition windows at least for passing from a long window to a short window.

Thus, in taking the second example described previously with reference to FIG. 2*e*, if a non-stationary phenomenon or "attack" is detected at time t=540, the present invention proposes to use a long window for the frame 0 (window extending from time t=256 to time t=511). Then, during the acquisition of the samples of the following frame (t=512 to t=767) and the detection of an attack at t=540, the coder uses eight short windows for encoding the samples from time t=368 (corresponding to t=512−M/2−Ms/2), to time t=655 (corresponding to t=512+M/2+Ms/2−1, where

- 2*M=512 is the size of the long window, and
- 2*Ms=64 is the size of the short window, in the example described), without a standard asymmetrical transition window as shown in FIGS. 1*b* and 1*c* with respect to the prior art.

At the level of the decoder, during the reception of the encoded frame with short windows, the decoder then proceeds to the following operations:

- reception of an item of information originating from the coder indicating that short windows must be used for the current frame, application of an advantageous processing to compensate for the direct transition from a long window to a short window during coding, an example of this processing being described in detail below, with reference to FIG. 5*b*.

Figure 3B:
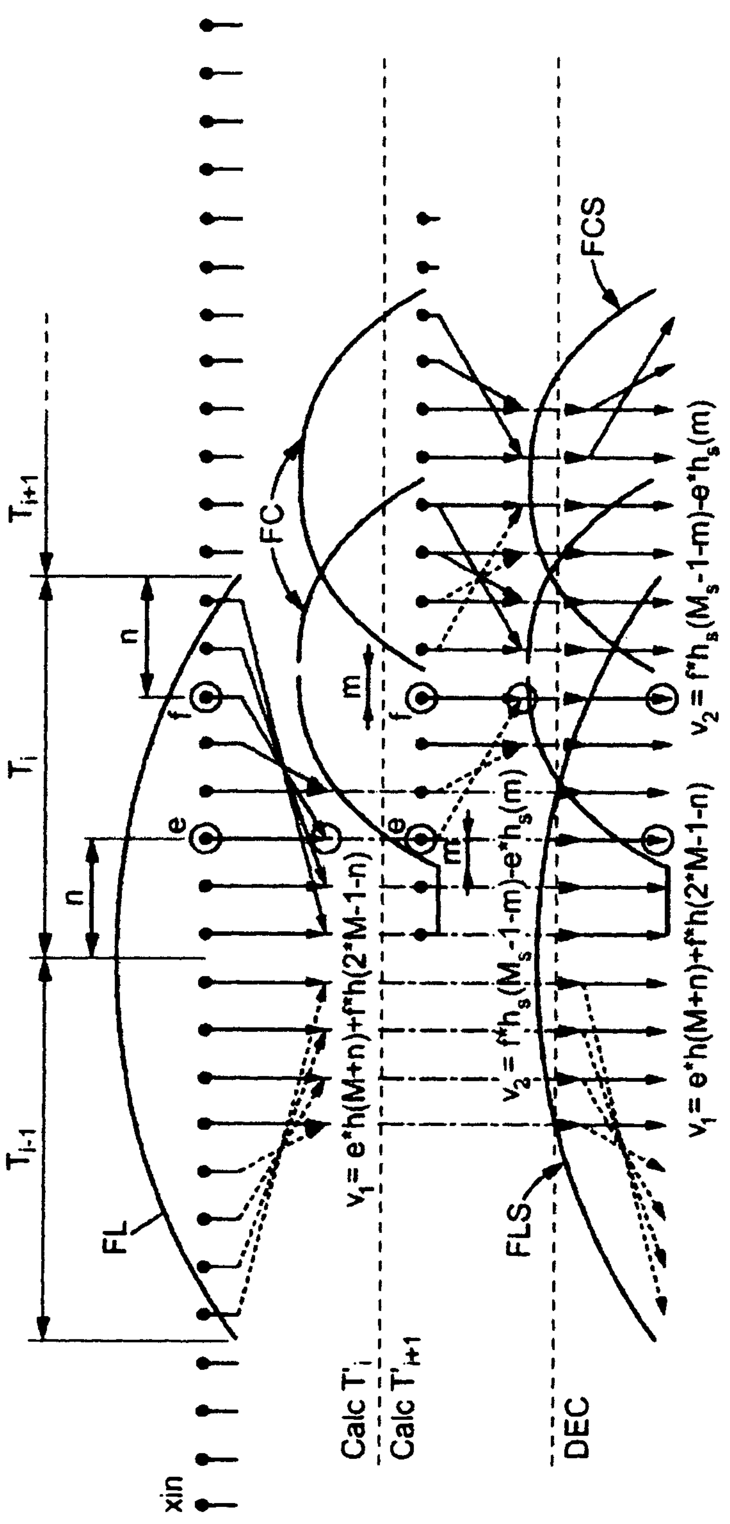

FIGS. 3*a* and 3*b* show the method of coding/decoding within the meaning of the invention in order to obtain on the one hand samples a and b which are found in a zone having no overlap between the long and short windows (FIG. 3*a*), and on the other hand the samples e and f found in this overlap zone (FIG. 3*b*). In particular, this overlap zone is defined by the falling edge of the long window FL and the rising edge of the first short window FC.

Thus with reference to FIGS. 3*a* and 3*b*, during coding, the samples of the frames $T_{i-1}$ and $T_i$ are weighted by the long analysis window FL in order to constitute the coded frame $T_i$ and the samples of the following frame $T'_i$ and $T_{i+1}$ are weighted directly by short analysis windows FC, without applying a transition window.

It will also be noted, with reference to FIGS. 3*a* and 3*b*, that the first short analysis window FC is preceded by values which are not taken into account by the short windows (for the samples preceding the sample e in the example in FIG. 3*b*). More particularly, this processing is applied to the first M/2−Ms/2 samples of the frame to be coded in a similar fashion to the coders/decoders of the prior art. Generally, it is sought to disturb as little as possible the processing carried out during coding, and similarly during decoding, in comparison with the prior art. Thus a choice is made for example to ignore the first samples of the coded frame $T'_{i+1}$.

Of course, in FIGS. 3*a* and 3*b*, only the case of two short (Ms=M/2) analysis windows FC has been shown. Nevertheless, as in the prior art, a succession of several short windows has been provided and each succession of short windows is illustrated in these FIGS. 3*a* and 3*b* bearing the reference FC.

Two embodiments are described below for decoding a frame $T'_{i+1}$ which has been coded using a short window FC while an immediately preceding frame $T'_i$ was coded using a long window FL.

In a first embodiment, the use of synthesis windows is completely dispensed with during decoding and it is demonstrated that the property of perfect reconstruction is ensured.

In FIG. 3*a*, during the detection of an attack requiring a change of window (from a long window directly to a short window), firstly the samples are synthesized from the short windows only (sample b in FIG. 3*a*). Then, the effect of the sample b calculated in advance is compensated for in the value v1 calculated from the long analysis window. The coding calculation (coded frame $T'_i$) for the sample a is carried out as follows:

$$v_i=a*h(M+n)+b*h(2*M-1-n).$$

On the other hand, the sample a is not weighted in the coding value v2 as the weighting calculation from the short window followed by a combination is carried out on a different temporal support (coded frame $T'_{i+1}$), and after reconstruction from the short windows we have:

$$v_2=b$$

Advantageously, perfect reconstruction is verified in the coding/decoding within the meaning of the invention. In fact:

$$a'=(v_1-v_2*h(2*M-1-n))/h(M+n)=a$$

It will also be noted that during decoding, the samples derived from values $v_2$=b and subsequent must be determined first, before the determination of the samples at the start of the frame (such as the sample a). A time reversal is therefore carried out during decoding.

In FIG. 3*b*, the coded samples of the transition zone between the long window FL (falling edge) and the first short window FC (rising edge), are calculated, thus at the level of samples e and f. The expression of the coded coefficients (or "values v1 and v2" hereafter) is given, in this overlap zone between the two windows FL and FC, by the following equations:

$$v1=e*h(M+n)+f*h(2*M-1-n),\text{and}$$

$$v2=f*h_s(M_s-1-m)-e*h_s(m)$$

At the decoder, this system of equations having two unknowns must thus be resolved in order to find the values of samples e and f:

$$e=[v1*h_s(M_s-1-m)-v2*h(2*M-1-n)]/[h(M+n)*h_s(M_s-1m)+h_s(m)*h(2*M-1-n)]$$

$$f=[v1*h_s(m)+v2*h(M+n)]/[h_s(Ms-1-m)*h(M+n)+h(2*M-1-n)*h_s(m)]$$

The formulae advantageously verifying the property of perfect reconstruction are also deduced:

$$e'=[v1*h_s(Ms+m)-v2*h(n)]/[h(M+n)*h_s(Ms+m)+h(2*M-1-n)*h_s(m)]=e,$$

and $$f=[v1*h_s(2*M_s-1-m)+v2*h(M-1-n)]/[h(M+n)*h_s(M_s+m)+h(2*M-1-n)*h_s(m)]=f,$$

$$\text{with } m=n-M/2+M_s/2$$

It will be noted that the value v2 is weighted by the long window h, in contrast to the provisions of the prior art (where v2 was weighted by the short window $h_s$ as shown at the bottom in FIG. 1*c*).

In a second embodiment, synthesis windows are retained during decoding. They have the same form as the analysis windows (homologues or duals of the analysis windows), as illustrated in FIGS. 3*a* and 3*b* and bearing the reference FLS for a long synthesis window and the reference FCS for a short synthesis window. This second embodiment has the advantage of being in accordance with the operation of decoders of the state of the art, namely using a long synthesis window for decoding a frame which has been coded with a long analysis window and using a series of short synthesis windows for decoding a frame which has been coded with a series of short analysis windows.

On the other hand, a correction of these synthesis windows is applied, by "compensation", for decoding a frame which has been coded with a long window, when it should have been coded with a long-short transition window. In other words, in order to compensate for the effect of the direct passing from a long window to a short window, at the coder, the processing described below is used for decoding a current frame $T'_{i+1}$ which has been coded by using a short window FC while an immediately-preceding frame $T'_i$ had been coded by using a long window FL.

The equations given above for the decoding and linking the samples a, b, e, f to the values v1 and v2, can be re-written in the form of weighted 2-term sums, as follows, carrying out in particular a time reversal.

Firstly, a position is adopted in the first short synthesis windows FCS and after the above-mentioned overlap zone (typically at the sample $v_2$=b and subsequent in the illustration by way of explanation in FIG. 3*a*). For the decoding of this part without overlap, from short synthesis windows FCS only, the "values" of the coded frame are firstly decoded from $v_2$=b (FIG. 3*a*). Once samples b and subsequent are decoded, the following 2-term weighted sum is applied:

$\hat{x}_n=w_{1,n}\tilde{l}_n+w_{2,n}s_{M-1-l}$, with $0\le n<M/2-Ms/2$, where:

- $\hat{x}_n$ represents the decoded samples (corresponding to the initial samples $x_n$, since the coding/decoding is of perfect reconstruction),
- the notation $\tilde{l}_n$ designates what would correspond to the samples which would have been decoded (application of a $DCT^{-1}$ inverse transform) by using a long synthesis window FLS, without correction, and
- $s_n$ represents the fully decoded samples (typically sample b and subsequent samples) using the succession of short synthesis windows FCS.

The two weighting functions $w_{1,n}$ and $w_{2,n}$ are then written:

$$w_{1,n}=\frac{1}{h^2(M+n)} \text{ and } w_{2,n}=-\frac{h(2M-n-1)}{h(M+n)}=-\frac{h(n)}{h(M+n)}, \text{ with } 0\le n<M/2-Ms/2$$

It will be understood that the "samples" $\tilde{l}_n$ are in reality values which are incompletely decoded by synthesis and weighting by using the long synthesis window. Typically this relates to the values $v_1$ in FIG. 3*a*, multiplied by the coefficients h(M+n) of the window FLS, and in which samples from the start of frame $T_i$, such as sample a, are also involved.

It will also be noted that samples b and subsequent are here determined first and are written in the formula "$s_{M-1-n}$" given above, thus illustrating the time reversal proposed by the decoding processing in this second embodiment.

It is also noted that the weighting carried out by the long synthesis window FLS is avoided as the latter is absent from the term $w_{1,n}$ (due to the division by h(M+n)).

Moreover, for the reconstruction of the portion of samples covered both by the long window FL (falling edge) and the first short window FC (rising edge), corresponding to the region of the samples e to f in FIG. 3*b*, preference is given to application of the following combination of two weighted terms:

$\hat{x}_n=w'_{1,n}\tilde{s}_m+w'_{2,n}\tilde{l}_n$, with $m=n-M/2+Ms/2$ and $M/2-Ms/2\le n<M/2+Ms/2$.

As previously, the terms $\tilde{l}_n$ constitute the values incompletely reconstituted by synthesis and weighting by the long synthesis window FLS and the terms $\tilde{s}_n$ represent the values incompletely reconstituted from the rising edge of the first short synthesis window FCS.

The weighting functions $w'_{1,n}$ and $w'_{2,n}$ are here given by:

$$w'_{1,n}=\frac{h(n)-\frac{h_s(m)h_s(Ms-1-m)}{h(M-1-n)}}{h(M-1-n)h_s(M_s-1-m)+h(n)h_s(m)}$$

and $$w'_{2,n}=\frac{\frac{h_s(Ms-1-m)}{h(M-1-n)}}{h(M-1-n)h_s(M_s-1-m)+h(n)h_s(m)}$$

All these weighting functions $w_{1,n}$, $w_{2,n}$, $w'_{1,n}$ and $w'_{2,n}$ are constituted by fixed elements which depend only on the long and short windows. Examples of the variation of such weighting functions are shown in FIGS. 4*a* and 4*b*. In an advantageous embodiment, the values taken by these functions can be calculated a priori (tabulated) and stored definitively in the memory of a decoder within the meaning of the invention.

Thus with reference to FIG. 5*b*, the processing during the decoding of a frame $T'_i$ which was coded when passing directly from a long analysis window to a short analysis window, can comprise the following steps, in one embodiment. For decoding the frame $T'_i$ (step 60), firstly a short synthesis window is applied (step 61) for decoding the end-of-frame value v2=b (step 63). Here reliance is placed on a following coded frame $T'_{i+1}$ (step 62) for determining b. A long synthesis window (step 64) is then applied for decoding the samples a at the start of frame $T'_i$ (step 65), by applying the compensation for any n comprised between 0 and M/2−Ms/2 using the relationship $\hat{x}_n=w_{1,n}\tilde{l}_n+w_{2,n}s_{M-1-n}$ (step 67) and using the previously calculated and tabulated weighting values $w_{1,n}$ and $w_{2,n}$ (step 66).

The decoding of the "central" region of the coded frame $T'_i$ (between e and f), thus for n comprised between M/2−Ms/2 and M/2+Ms/2, can be carried out in parallel ("+" sign in FIG. 5*b*) by using both the short and long synthesis windows (step 68) and by applying the compensation in particular (step 69) from the relationship $\hat{x}_n=w'_{1,n}\tilde{s}_m+w'_{2,n}\tilde{l}_n$, where m=n−M/2+Ms/2 and with the weighting values $w'_{1,n}$ and $w'_{2,n}$ previously calculated and tabulated (step 70). Finally from this processing (step 71) the values are deduced for all types of samples a, b, e or f of the initial frame $T_i$.

The first and second embodiments described above, during the decoding of a frame $T'_i$ which was coded by passing directly from a long analysis window to a short analysis window, guarantee a perfect reconstruction and then during coding, make it efficiently possible to pass, directly from a long window to a short window.

There will now be described, with reference to FIG. 5*a*, an embodiment in which it is proposed to dispense with the application during coding of a long-short transition window, at least in certain cases.

On receiving a frame $T_i$ (step 50), the presence of a non-stationary phenomenon, such as a attack ATT (test 51) is sought in the digital audio signal directly present in this frame $T_i$. As long as no phenomenon of this type is detected (arrow n at the output of test 51), the application of long windows (step 52) is continued for the coding of this frame $T_i$ (step 56). If not (arrow y at the output of test 51), it is sought to determine if the event ATT is at the start (for example in the first half) of the current frame $T_i$ (test 53), in which case (arrow y at the output of test 53) a short window, more precisely a series of short windows, is applied directly (step 54), for the coding of frame $T_i$ (step 56). This embodiment then makes it possible to avoid a transition window and not to wait for the following frame $T_{i+1}$ to apply a short window.

Thus, it will be understood that contrary to the state of the art, it is possible to detect a particular event such as a non-stationary phenomenon directly in the frame being coded $T_i$ and not in a following frame $T_{i+1}$. The coding delay within the meaning of the invention is then reduced in comparison with that of the prior art. In fact, if the non-stationary phenomenon is detected at the start of the current frame, a short window is applied directly, while in the prior art, it would have been necessary to detect the non-stationary phenomenon in a following frame $T_{i+1}$ in order to be able to apply a transition window to the frame during coding $T_i$.

Referring again to FIG. 5*a*, if the non-stationary phenomenon is detected at the end (for example in the second half) of the current frame $T_i$ (arrow n at the output of test 53), it is possible advantageously to choose to apply a transition window (step 55) for coding the frame in progress $T_i$ (step 56), before applying a succession of short windows. This embodiment makes it possible in particular to propose a processing equivalent to that of the state of the art, while ensuring a reduced coding delay.

Therefore, in more generic terms, at least three weighting windows are provided in this embodiment:

a short window, a long window, and a transition window for passing from a use of the long window to a use of the short window, and if a particular event such as a non-stationary phenomenon is detected at the end of the current frame (step 53), a transition window (step 55) is applied for coding (step 56) the current frame ($T_i$).

In a variant of this embodiment, there can be provided, for passing from a use of a long window to a use of a short window:

for a current frame $T_i$, the use of a long window FL, and for an immediately consecutive frame $T_{i+1}$, the direct use of a short window FC, without using a transition window, even if the particular event is detected at the end of the current frame.

This variant has the following advantage. As the coder must send to the decoder an item of information on the change of window type, this information can be coded on a single bit as it no longer needs to inform the decoder of the choice between a short window and a transition window.

A transition window can nevertheless be retained for passing from a short window to a long window and in particular for continuing to ensure the transmission of the information on the change of window type on a single bit, following the reception of an item of information of passing from the long window to the short window, the decoder can to this end:

use the short window, then, in the absence of reception of information of a change of window type, use a transition window from a short window to a long window, then finally, use a long window.

The communication of information of the type of window used during coding is illustrated in FIG. 6, from a coder 10 to a decoder 20. It will be recalled that the coder 10 comprises a detection module 11 of a particular event such as a strong attack in the signal contained in a frame $T_i$ during coding and that it deduces the type of window to use from this detection. To this end, a module 12 selects the type of window to use and transmits this information to the coding module 13 which delivers the coded frame $T'_i$ using the analysis window FA selected by the module 12. The coded frame $T'_i$ is transmitted to the decoder 20, with the information INF on the type of window used during coding (generally in a single data flow). The decoder 20 comprises a module 22 for selecting the synthesis window FS according to the information INF received from the coder 10 and the module 23 applies the decoding of the frame $T'_i$ in order to deliver a decoded frame $\hat{T}_i$.

The present invention also relates to a coder such as the coder 10 in FIG. 6 for implementing the method within the meaning of the invention and more particularly for implementing the processing shown in FIG. 5*a*, or its variant described previously (transmission of the information of a change of window type on a single bit).

The present invention also relates to a computer program intended to be stored in the memory of such a coder and comprising instructions for implementing such a processing, or its variant, when such a program is executed by a processor of the coder. To this end, FIG. 5*a* can represent the flow chart of such a program.

It will be recalled that the coder 10 uses analysis windows FA and the decoder 20 can use synthesis windows FS, according to the second embodiment above, these synthesis windows being homologues of the analysis windows FA, by nevertheless proceeding to the correction by compensation described previously (by using the weighting functions $w_{1,n}$, $w_{2,n}$, $w'_{1,n}$ and $w'_{2,n}$).

The present invention also relates to another computer program, intended to be stored in the memory of a transform decoder such as the decoder 20 illustrated in FIG. 6, and comprising instructions for the implementation of the decoding according to the first embodiment, or according to the second embodiment described above with reference to FIG. 5*b*, when such a program is executed by a processor of this decoder 20. To this end, FIG. 5*b* can represent the flow chart of such a program.

The present invention also relates to the transform decoder itself, then comprising a memory storing the instructions of a computer program for the decoding.

In generic terms, the transform decoding method within the meaning of the invention, of a signal represented by a succession of frames which have been coded by using at least two types of weighting windows, of different respective lengths, is carried out as follows.

In the case of the reception of an item of information for passing from a long window to a short window:

samples (of type b) are determined from a decoding applying a type of short synthesis window FCS to a given frame $T'_{i+1}$ which was coded by using a short analysis window FC, and complementary samples are obtained by:

partially decoding (application of an inverse transform $DCT^{-1}$) a frame $T'_i$ preceding the given frame and which was coded by using a type of long analysis window FL, and by applying a combination of two weighted terms involving weighting functions which can be tabulated and stored in the memory of a decoder.

In the second above embodiment, functions marked $w_{1,n}$, $w_{2,n}$, $w'_{1,n}$, $w'_{2,n}$ are involved.

However, this generic decoding processing is applied in the two cases of the first and second embodiments.

In the second embodiment:

firstly (step 63 in FIG. 5*b*) the samples (b) from the given frame ($T'_{i+1}$), are determined, and samples (a) are deduced therefrom (steps 65-67) which correspond temporally to the start of the previous frame ($T'_i$), these originating from a decoding applying a long synthesis window FLS and belonging to the second embodiment.

In this case, for:

a frame comprising M samples, a long window comprising 2M samples, a short window comprising 2Ms samples, Ms being less than M, the samples $\hat{x}_n$, for n comprised between 0 and (M/2−Ms/2), n=0 corresponding to the start of a frame being decoded, are given by a combination of two weighted terms of the type:

$$\hat{x}_n = w_{1,n}\tilde{l}_n + w_{2,n}s_{M-1-n}, \text{where:}$$

$\tilde{l}_n$ are values (v1) originating from the previous frame $T'_i$, $s_{M-1-n}$ are samples (b) already decoded by using short synthesis windows applied to the given frame $T'_{i+1}$, and $w_{1,n}$ and $w_{2,n}$ are weighting functions of which the values taken as a function of n can be tabulated and stored in the memory of the decoder.

If not, for n comprised between (M/2−Ms/2) and (M/2+Ms/2), the samples $\hat{x}_n$ are given by a combination of two weighted terms of the type:

$$\hat{x}_n = w'_{1,n}\tilde{s}_m + w'_{2,n}\tilde{l}_n, \text{ with } m = n - M/2 + Ms/2, \text{where:}$$

$\tilde{l}_n$ are values v1 originating from the previous frame $T'_i$, $\tilde{s}_m$ are values v2 originating from the given frame $T'_{i+1}$, and $w'_{1,n}$ and $w'_{2,n}$ are weighting functions of which the values taken as a function of n can also tabulated and stored in the memory of the decoder.

The present invention therefore makes it possible to offer the transition between windows with a reduced delay compared to the prior art while retaining the property of perfect reconstruction of the transform. This method can be applied with all types of windows (non-symmetrical windows and different analysis and synthesis windows) and for different transforms and filter banks.

The compensation processings presented above in the case of a transition of a long window to a window of a shorter size extending naturally and similarly to the case of a transition of a short window to a window of a greater size. In this case, the absence of a short-long transition window can be compensated for at the decoder by a weighting similar to the case presented above.

The invention can then be applied to any transform coder, in particular those provided for interactive conversational applications, such as in the MPEG-4 "AAC-Low Delay" standard, but also to transforms differing from MDCT transforms, in particular the above-mentioned Extended Lapped Transforms (ELT) and their biorthogonal extensions.

However, in the case of a transform of the ELT type in particular, it has been observed that the terms of temporal folding due to modulation (v1) can be combined with temporal folding terms originating in the past. Thus, the corrective processing shown above takes account of an influence phenomenon (or "aliasing") of future samples. On the other hand, the development presented below also takes account of the past components in order to cancel them so as to obtain a perfect reconstruction, at least in the absence of quantification. It is therefore proposed to define here an additional weighting function which, combined with the synthesized past signal, makes it possible to dispense with the temporal folding terms.

Taken as an example of an ELT transform below is that described in the document: "*Modulated Filter Banks with Arbitrary System Delay: Efficient Implementations and the Time-Varying Case*", Gerald D. T. Schuller, Tanja Karp, IEEE Transactions on Signal Processing, Vol. 48, No. 3 (March 2000).

The following embodiment proposes, within the framework of the present invention, passing without transition between a long window (for example having 2048 samples) and a short window (for example having 128 samples).

Transform with Long Window (K=4, M=512)

This is a low-delay transform, the window of which has the size K·M=2048, and the analysis of which is written in the form:

$$X_{t,k} = -2 \cdot \sum_{n=-2M}^{2M-1} z_{t,n}^{a} \cos\left(\frac{\pi}{M}\left(n - \frac{M}{2} + \frac{1}{2}\right)\left(k + \frac{1}{2}\right)\right)$$

$$\text{for } 0 \le k \le M-1$$

M being the number of spectral components obtained, $z_{t,n}^{a} = w_{LD}(2M-1-n)\cdot x_{n+tM}$, for $-2M \le n \le 2M-1$, being the notation of the windowed input signal, and $w_{LD}(n) = w_L^{s}(n)$ being the notation of the long synthesis window.

FIG. 7 illustrates this long synthesis window for the case of an ELT transform having M=512 components and an overlap coefficient K=4.

The inverse transform is written:

$$x_{n+tM}^{inv} = -\frac{1}{M}\sum_{k=0}^{M-1} X_{t,k}\cos\left(\frac{\pi}{M}\left(n - \frac{M}{2} + \frac{1}{2}\right)\left(k + \frac{1}{2}\right)\right),$$

$$\text{for } 0 \le n \le 4M-1$$

and the reconstructed signal $x_{n+tM}$ is obtained by overlap addition of four elements (K=4):

$$X_{n+tM} = z_{t,n} + z_{t-1,n+M} + z_{t-2,n+2M} + z_{t-3,n+3M} \text{ for } 0 \le n \le M-1$$

$$\text{and } z_{t,n} = w_{LD}(n)\cdot x_{n+tM}^{inv}$$

It will be noted that the synthesis window is defined as follows:

$$w_L^{s}(n) = w_{LD}(n), \text{for } 0 \le n \le 4M-1,$$

while the analysis window is defined from the synthesis window by inversion of the order of the samples, i.e.:

$$w_L^{a}(n) = w_{LD}(4M-1-n), \text{for } 0 \le n \le 4M-1.$$

Transform with Short Window (K=2, $M_s$=64)

The analysis transform is written, in the case of a short window, in the form:

$$X_{t,k} = -2 \cdot \sum_{n=0}^{2M_s-1} z_{t,n}^{a}\cos\left(\frac{\pi}{M_s}\left(n - \frac{M_s}{2} + \frac{1}{2}\right)\left(k + \frac{1}{2}\right)\right),$$

$$\text{for } 0 \le k \le M_s - 1,$$

with:

$z_{t,n}^{a} = w_S(2M_s-1-n)\cdot x_{n+tM_s}$ for $0 \le n \le 2M_s-1$ as windowed input signal, and $w_s(n)$, as short synthesis window.

The inverse transform is written:

$$x_{n+tM_s}^{inv} = -\frac{1}{M_S}\sum_{k=0}^{M_s-1} X_{t,k}\cos\left(\frac{\pi}{M_s}\left(n - \frac{M_s}{2} + \frac{1}{2}\right)\left(k + \frac{1}{2}\right)\right),$$

$$\text{for } 0 \le n \le 2M_s - 1$$

and the reconstructed signal $x_{n+tM}$ is obtained by overlap addition of two elements ($K_s$=2):

$$x_{n+tM_s} = z_{t,n} + z_{t-1,n+M_s} \text{ for } 0 \le n \le M_s-1$$

$$\text{and } z_{t,n} = w_s(n) - x_{n+tM_s}^{inv}$$

In this notation, t is the index of the short frame, and the analysis and synthesis windows are identical, because they are symmetrical, with:

$$w_a(n) = w_S(n) = \sin\left[\frac{\pi}{2M_S}(n + 0.5)\right],\ 0 \le n < 2M_s$$

Expressions of the Weighting Functions

In this embodiment, for:

a frame comprising M samples, a long window comprising 4M samples, a short window comprising 2Ms samples, Ms being less than M, for n comprised between 0 and M/2−Ms/2 (n=0 corresponding to the start of a frame in the process of decoding), the samples $\hat{x}_n$ are given by a combination of four weighted terms of type:

$$\hat{x}_n = w_{1,n}\tilde{I}_n + w_{2,n}s_{M-1-n} + w_{3,n}s_{n-2M} + w_{4,n}s_{-M-1-n}, \text{with } 0 \le n \le M/2 - M_s/2, \text{where:}$$

$\hat{x}_n$ represents the decoded samples (corresponding to the initial samples $x_n$ if the coding/decoding is of perfect reconstruction), the notation $\tilde{I}_n = z_{t,n+M} + z_{t-1,n+2M} + z_{t-2,n+3M}$ designates that which would correspond to samples which would have been incompletely decoded of the frame ($T'_i$) preceding the given frame ($T'_{i+1}$) (application of an inverse transform), by using a long synthesis window with addition to the preceding memory elements $z_{t-1,n+2M} + Z_{t-2,n+3M}$ without correction of the frame $T'_i$, $s_n$ represents the samples completely decoded using the succession of short synthesis windows FCS of the frame $T'_{i+1}$ (for the samples of index n such that $M/2+M_s/2 \le n < M$) and the completely-decoded samples of the previous frames (then referenced $s_{n-2M}$ for $0 \le n < M$, which is equivalent to $\{s_{-2M}, s_{-2M+1}, \ldots, s_{-M-1}\}$, and $w_{1,n}$ and $w_{2,n}$, $w_{3,n}$ and $w_{4,n}$ are weighting functions of which the values taken as a function of n can be tabulated and stored in the memory of the decoder or calculated as a function of the long and short analysis and synthesis windows.

Advantageously, the following expressions can be chosen as weighting functions, in particular with a view to ensuring perfect reconstruction:

for $0 \le n < M/2 - Ms/2$ $$w_{1,n} = \frac{1}{h(M+n) \cdot h(M-1-n)}$$

$$w_{2,n} = \frac{h(n)}{h(M-n-1)}$$

$$w_{3,n} = -\frac{h(n)h(4M-1-n)}{h(M+n) \cdot h(M-1-n)}$$

$$w_{4,n} = -\frac{h(n)h(3M+n)}{h(M+n) \cdot h(M-1-n)}$$

It will be noted that the forms of $w_{1,n}$ and $w_{2,n}$ are slightly different to those disclosed previously in the case of the MDCT transform. In fact, the filters are no longer symmetrical (so that the term $h^2$ disappears) and the modulation terms are changed, which explains the change of sign.

Then, still in this embodiment, for n comprised between M/2−Ms/2 and M/2+Ms/2, the samples $\hat{x}_n$ are given by a combination of four weighted terms of the type:

$$\hat{x}_n = w'_{1,n}\tilde{I}_n + w'_{2,n}\tilde{s}_m + w'_{3,n}s_{n-2M} + w'_{4,n}s_{-M-1-n},$$

with $m = n - M/2 + Ms/2$ and $M/2 - Ms/2 \le n < M/2 + Ms/2$.

According to the same notations:

$\tilde{I}_n$ are incompletely-decoded samples of the frame $T'_i$ preceding the given frame $T'_{i+1}$, $\tilde{s}_m$ are incompletely-decoded samples of the first short window of the given frame $T'_{i+1}$, and $s_n$ represents the samples completely decoded in the previous frames ($T'_{i-1}, T'_{i-2}, \ldots$), and $w'_{1,n}$, $w'_{2,n}$, $w'_{3,n}$ and $w'_{4,n}$ are weighting functions the values of which taken as a function of n can also be tabulated and stored in the memory of the decoder or calculated as a function of the long and short analysis and synthesis windows. Advantageously, weighting functions can be chosen according to the following forms in order to ensure perfect reconstruction:

for $M/2 - Ms/2 \le n < M/2 + Ms/2,\ m = n - M/2 + Ms/2$ $$w'_{1,n} = \frac{\dfrac{h_s(M_s-1-m)}{h(M+n)}}{h(M-1-n)h_s(M_s-1-m) + h(n)h_s(m)}$$

$$w'_{2,n} = \frac{h(n) - \dfrac{h_s(m)h_s(Ms-1-m)}{h(M+n)}}{h(M-1-n)h_s(M_s-1-m) + h(n)h_s(m)}$$

$$w'_{3,n} = -h(n)h(4M-1-n)\frac{\dfrac{h_s(Ms-1-m)}{h(M+n)}}{h(M-1-n)h_s(M_s-1-m) + h(n)h_s(m)}$$

$$w'_{4,n} = -h(n)h(3M+n)\frac{\dfrac{h_s(Ms-1-m)}{h(M+n)}}{h(M-1-n)h_s(M_s-1-m) + h(n)h_s(m)}$$

Thus, in this embodiment, during a transition between a long window and a short window, the signal is reconstructed from the combination of:

a weighted version of the samples reconstructed from the short windows, a weighted version of the samples partially reconstructed from the long window (integrating the memory terms $z_{t-1,n+2M} + z_{t-2,n+3M}$)

and a weighted version of a combination of past synthesized signal samples.

In a variant of this embodiment, it will be noted that the functions $w'_{3,n}$ and $w'_{4,n}$ do not greatly differ. Only the terms h(4M−1−n) and h(3M+n) differ in their expression. One embodiment can for example consist of preparing the terms $h(4M-1-n)s_{n-2M} + h(3M+n)s_{-M-1-n}$, then weighting the result by a function which is expressed by:

$$w''_{3-4,n} = -h(n)\frac{\dfrac{h_s(Ms-1-m)}{h(M+n)}}{h(M-1-n)h_s(M_s-1-m) + h(n)h_s(m)}$$

and which thus corresponds to the functions $w'_{3,n}$ and $w'_{4,n}$ from which the contributions of the terms h(4M−1−n) and h(3M+n) have been removed.

This same principle applies in a similar fashion to $w_{3,n}$ and $w_{4,n}$.

In another variant, the synthesis memory is weighted. Advantageously, this weighting can be a setting to zero of the synthesis memories so that the samples incompletely reconstructed from the long window are added to a weighted memory $z_{t-1,n+2M}+z_{t-2,n+3M}$. In this case, the weighting applied to the past-synthesized signal can be different.

The characteristic forms of the weighting functions w and w' obtained in the embodiment disclosed previously are shown in FIGS. 9 and 10. In particular, referring to the y-axis values of these graphs, it appears that the functions $w'_{3,n}$ and $w'_{4,n}$ shown in FIG. 10 can be ignored (taking account of their values taken) in relation to the functions $w'_{1,n}$ and $w'_{2,n}$ shown in FIG. 9. The terms in which the functions $w'_{3,n}$ and $w'_{4,n}$ are involved could therefore be omitted in the sum $\hat{x}_n$ which was given above with a view to the reconstruction of the signal $\hat{x}_n$. This omission would lead to a low reconstruction error.

In a variant also envisaging greater processing simplicity, it also appears that $w'_{3,n}$ and $w'_{4,n}$ are very similar. It could thus be provided to use only a combination of these two weightings, for example an average of the two functions, in order to achieve a gain in calculating time.

The comparison in FIGS. 8 (representing the appearance of the weighting functions $w_{1,n}$ and $w_{2,n}$) and 12 (representing the appearance of the weighting functions $w_{3,n}$ and $w_{4,n}$) invokes the same remarks for the functions $w_{3,n}$ and $w_{4,n}$ in relation to the functions $w_{1,n}$ and $w_{2,n}$.

It is therefore possible to simplify the previous expressions of $\hat{x}_n$:

$$\text{in } \hat{x}_n = w_{1,n}\tilde{l}_n + w_{2,n}s_{M-1-n} \quad [1],$$

if the weightings by the functions $w_{3,n}$ and $w_{4,n}$ are omitted, $$\text{or in } \hat{x}_n = w_{1,n}\tilde{l}_n + w_{2,n}s_{M-1-n} + w_{3-4,n}(s_{n-2M} + s_{-M-1-n}) \quad [2],$$

with, for example, $$w_{3-4,n} = \frac{1}{2}(w_{3,n} + w_{4,n})$$

or any other linear combination of these two functions which would lead to a moderate reconstruction error.

It should be noted that the omission of the weightings by the functions $w_{3,n}$ and $w_{4,n}$ leads to a reconstruction error having a power of 84 dB below the signal and that the use of a simple linear combination (average of these functions for example) itself leads to an error of 96 dB below the signal, which in both cases is already very satisfactory for audio applications. It should be noted that a perfect reconstruction in practice regularly makes it possible to measure an error power of 120 to 130 dB below the signal.

Moreover, no longer using the memory terms $s_{n-2M}$ and $s_{-M-1-n}$ in the weighting [1] makes it possible to avoid spreading the quantification noise from the past. Thus an to imperfect reconstruction in the absence of quantification is exchanged for a limitation of the quantification noise when the signal is coded in fine.

It should also be noted that, on the temporal support 0-128 (FIGS. 8 and 12), the weighting functions have the particular forms:

$$\begin{cases} w_{1,n} = 1 \\ w_{2,n} = 0 \\ w_{3,n} = 0 \\ w_{4,n} = 0 \end{cases}$$

This observation is explained by the form of the window h(n) (FIG. 7) which comprises, in the example described, a first part having a zero amplitude between 0 and 128. Consequently, in this example, it is preferable, in terms of complexity, to break down the first reconstruction into two phases:

$$\hat{x}_n = \tilde{l}_n, \text{for } 0 \le n < 128$$

$$\text{and } \hat{x}_n = w_{1,n}\tilde{l}_n + w_{2,n}s_{M-1-n} + w_{3,n}s_{n-2M}w_{4,n}s_{-M-1-n}, \text{for } 128 \le n < M/2 - Ms/2 = 224$$

In an embodiment having an advantageous algorithmic structure, the weighting functions $w_{1,n}$ and $w_{2,n}$ (FIG. 11), on the one hand, and $w_{3,n}$ and $w_{4,n}$ (FIG. 12), on the other hand, can be defined over the whole interval from 0 to (M+Ms)/2, as disclosed hereinafter.

In a first step, a calculation of a primary expression (marked $\tilde{x}_n$) of the signal $\hat{x}_n$ to be reconstructed is made from 0 to (M+Ms)/2, as follows:

- *$\tilde{x}_n = w_{1,n}\tilde{l}_n + w_{3,n}s_{n-2M} + w_{4,n}s_{-M-1-n}$ (which leads to the calculation of the function $w_{1,n}$ shown over the whole range of n comprised between 0 and M/2+Ms/2 in FIG. 11, as well as the functions $w_{3,n}$ and $w_{4,n}$ calculated over this same range and shown in FIG. 12).

Then, for n comprised between 0 and M/2−Ms/2 (n=0 corresponding to the start of a frame in the process of decoding), let:

- *$\hat{x}_n = \tilde{x}_n + w_{2,n}s_{M-1-n}$ where $w_{2,n}$ corresponds to the start of the curve referenced $w_{2,n}$ in FIG. 11 (before 224 on the x-axis).

and for n comprised between M/2−Ms/2 and M/2+Ms/2, let:

$\hat{x}_n = \tilde{x}_n + w'_{2,n}\tilde{s}_m$, with m=n−M/2+Ms/2 and M/2−Ms/2≤n<M/2+Ms/2, and where $w'_{2,n}$ corresponding to the end of the referenced curve $w_{2,n}$ in FIG. 11 (after 224 on the x-axis).

This distinction of specific processing for weighting by the functions $w_{2,n}$ and $w'_{2,n}$ is explained as follows.

For each function $w_{1,n}$, $w_{3,n}$ and $w_{4,n}$ it is possible to use only a single variation between 0 and M/2+Ms/2. On the other hand, for the functions $w_{2,n}$ and $w'_{2,n}$:

- the function $w_{2,n}$ weights the completely-decoded samples,
- while the function $w'_{2,n}$ weights the incompletely-decoded samples.

Moreover, a "time reversal" of the processing will be noted for the weighting $w_{2,n}$ only (index of s in −n) and not for the weighting $w'_{2,n}$.

Thus, in order to summarize in general terms this development making it possible to reduce the influence of past samples for the complete decoding of samples during a transition from a long window (with an overlap K>2) to a short window (with an overlap K'<K), the decoded samples are obtained by a combination of at least two weighted terms involving the past synthesis signal.

The invention claimed is:

1. A method for transform decoding of a signal represented by a succession of frames which were coded by using at least two types of weighting windows,

- wherein said at least two types of weighting windows have different respective lengths, said different respective lengths being either a short window or a long window;
- wherein each individual frame in said succession of frames is coded using at least one of said at least two types of weighting windows; and
- wherein upon reception of a frame when changing from a long window to a short window:
- samples are determined, at a transform decoder, from a decoding applying a type of short synthesis window to a given frame which was coded by using a short analysis window, and complementary samples are obtained by:

decoding only a portion of a frame preceding the given frame and which was coded by using a type of long analysis window, weighting samples of the given frame and samples of the preceding frame using at least two weighted terms involving weighting functions tabulated and stored in the memory of a decoder;

wherein said method is performed by a decoder device.

2. A method according to claim 1, wherein:

samples originating from the given frame are firstly determined, and from these samples are deducted samples corresponding temporally to the start of the previous frame, these samples originating from a decoding applying a long synthesis window.

3. A method according to claim 2, in which:

a frame comprises M samples, a long window comprises 2M samples, a short window comprises 2Ms samples, Ms being less than M, wherein the samples $\hat{x}_n$, for n comprised between 0 and (M/2−Ms/2), n=0 corresponding to the start of a frame in the process of decoding, are given by a combination of two weighted terms of type:

$$\hat{x}_n = w_{1,n}\tilde{l}_n + w_{2,n}s_{M-1-n} \text{ where:}$$

$\tilde{l}_n$ are values originating from the previous frame, and $s_{M-1-n}$ are samples already decoded by using short synthesis windows applied to the given frame, and $w_{1,n}$ and $w_{2,n}$ are weighting functions, the values of which as a function of n are tabulated and stored in the memory of the decoder.

4. A method according to claim 1, in which:

a frame comprises M samples, a long window comprises 2M samples, a short window comprises 2Ms samples, Ms being less than M, wherein the samples $\hat{x}_n$, for n comprised between (M/2−Ms/2) and (M/2+Ms/2), n=0 corresponding to the start of a frame in the process of decoding, are given by a combination of two weighted terms of type:

$$\hat{x}_n = w'_{1,n}\tilde{s}_m + w'_{2,n}\tilde{l}_n, \text{with } m = n - M/2 + Ms/2, \text{where:}$$

$\tilde{l}_n$ are values originating from the previous frame, $\tilde{s}_m$ are values originating from the given frame, and $w'_{1,n}$ and $w'_{2,n}$ are weighting functions, the values of which as a function of n are tabulated and stored in the memory of the decoder.

5. A method according to claim 1, wherein, for a decoding of frames coded by an overlap transform coding, with a view to reducing an influence of past samples, the signal to be decoded is reconstructed from a combination of:

a weighting of samples reconstructed from short windows, a weighting of samples partially reconstructed from a long window, and a weighting of samples of the past decoded signal.

6. A method according to claim 5, wherein, with:

a frame comprising M samples, a long window comprising 4M samples, a short window comprising 2Ms samples, Ms being less than M for a sample index n comprised between 0 and M/2−Ms/2, n=0 corresponding to the start of a frame in the process of decoding, the samples $\hat{x}_n$ to be decoded are produced by a combination of four weighted terms of type:

$$\hat{x}_n = w_{1,n}\tilde{l}_n + w_{2,n}s_{M-1-n} + w_{3,n}s_{n-2M} + w_{4,n}s_{-M-1-n},$$

with $0 \le n < 2M/2 - Ms/2$, where:

the notation $\tilde{l}_n = z_{t,n+M} + z_{t-1,n+2M} + z_{t-2,n+3M}$ denotes incompletely-decoded samples of the frame preceding the given frame, by using a long synthesis window with addition without correction to preceding memory elements denoted $z_{t-1,n+2M} + z_{t-2,n+3M}$, the index t being a frame index, $s_n$ represents samples completely decoded using a succession of short synthesis windows of the given frame, for $M/2+M_s/2 \le n < M$, and completely-decoded samples of previous frames for $-2M \le n < M$, and $w_{1,n}$, $w_{2,n}$, $w_{3,n}$ and $w_{4,n}$ are respectively first, second, third and fourth weighting functions dependant on the sample index n and the values taken by at least the first and second weighting functions $w_{1,n}$ and $w_{2,n}$, as a function of n, are tabulated and stored in the memory of the decoder.

7. A method according to claim 5, wherein, with:

a frame comprising M samples, a long window comprising 4M samples, a short window comprising 2Ms samples, Ms being less than M for n comprised between M/2−Ms/2 and M/2+Ms/2, the samples $\hat{x}_n$ to be decoded are given by a combination of four weighted terms of type:

$$\hat{x}_n = w'_{1,n}\tilde{l}_n + w'_{2,n}\tilde{s}_m + w'_{3,n}s_{n-2M} + w'_{4,n}s_{-M-1-n}, \text{where:}$$

$\tilde{l}_n$ are incompletely-coded samples of the frame preceding the given frame, $\tilde{s}_m$ are incompletely-decoded samples of the first short window of the given frame, with m=n−M/2+Ms/2, $s_n$ represents the completely-decoded samples of the previous frames, $w'_{1,n}$, $w'_{2,n}$, $w'_{3,n}$, $w'_{4,n}$ are respectively first, second, third and fourth weighting functions dependant on n and the values taken by at least by the first and second weighting functions $w'_{1,n}$ and $w'_{2,n}$, as a function of n, are tabulated and stored in the memory of the decoder.

8. A method according to claim 6, wherein the contributions of the third and fourth weighting functions are ignored in the calculation of the samples $\hat{x}_n$ so that only the values taken by the first and second weighting functions, as a function of n, are tabulated and stored in the memory of the decoder.

9. A method according to claim 6, wherein the third and fourth weighting functions are given by a single weighting function resulting from a linear combination of said third and fourth weighting functions, such that only the values taken by the first and second weighting functions, as well as the values taken by said single weighting function, as a function of n, are tabulated and stored in the memory of the decoder.

10. A method according to claim 6, wherein:

there is calculated for n from 0 to (M+Ms)/2, a primary expression $\tilde{x}_n$ of the signal $\hat{x}_n$ to be decoded, according to a weighted combination of type:

$$\tilde{x}_n = w_{1,n}\tilde{l}_n + w_{3,n}s_{n-2M} + w_{4,n}s_{-M-1-n},$$

for n comprised between 0 and M/2−Ms/2, n=0 corresponding to the start of a frame in the process of decoding, let:

$$^*\hat{x}_n = \tilde{x}_n + w_{2,n}s_{M-1-n}, \text{and}$$

for n comprised between M/2−Ms/2 and M/2+Ms/2, let:

$$^*\hat{x}_n = \tilde{x}_n + w'_{2,n}\tilde{s}_m, \text{with } m = n - M/2 + Ms/2.$$

11. A non-transitory computer readable memory of a transform decoder, storing a computer program comprising instructions for the implementation of the decoding method according to claim 1, when the instructions are executed by a processor of such a decoder.

12. A transform decoder device, comprising a memory storing the instructions of a computer program according to claim 11.

13. A transform decoder configured to decode a signal represented by a succession of frames originating from a coder using at least two types of weighting windows wherein said at least two types of weighting windows have different respective lengths, said different respective lengths being either a short window or a long window;

wherein each individual frame in said succession of frames is coded using at least one of said at least two types of weighting windows; and wherein the decoder comprises at least:

means for receiving a frame when changing from a long window to a short window;

means for, upon reception of a frame when changing from a long window to a short window, determining samples from a decoding applying a type of short synthesis window to a given frame which was coded by using a short analysis window, and means for, upon reception of a frame when changing from a long window to a short window, obtaining complementary samples configured to:

decode only a portion of a frame preceding the given frame and which was coded by using a type of long analysis window, and to weighting samples of the given frame and samples of the preceding frame using at least two weighted terms involving weighting functions tabulated and stored in the memory of the decoder.

* * * * *

UNITED STATES PATENT AND TRADEMARK OFFICE

CERTIFICATE OF CORRECTION

PATENT NO. : 8,615,390 B2
APPLICATION NO. : 12/448734
DATED : December 24, 2013
INVENTOR(S) : Kovesi et al.

It is certified that error appears in the above-identified patent and that said Letters Patent is hereby corrected as shown below:

In the Specification

In column 5 at line 54, Change “to a” to --a--.

In column 8 at line 39, Change “to embodiment” to --embodiment--.

In column 10 at line 17, Change “($M_s$-1m)” to --($M_s$-1-m)--.

In column 19 at line 26, Change “ $\hat{x}_n = w_{1,n}\tilde{l}_n + w_{2,n}s_{M-1}.n$ ” to -- $\hat{x}_n = w_{1,n}\tilde{l}_n + w_{2,n}s_{M-1-n}$ --.

In column 19 at line 50, Change “an to” to --an--.

In the Claims

In column 21 at line 60, In Claim 6, change “M” to --M,--.

In column 22 at line 21, In Claim 7, change “M” to --M,--.

Signed and Sealed this
Twelfth Day of August, 2014

Michelle K. Lee

Michelle K. Lee
*Deputy Director of the United States Patent and Trademark Office*